US011252093B2

(12) United States Patent
Goel

(10) Patent No.: US 11,252,093 B2
(45) Date of Patent: Feb. 15, 2022

(54) METHODS, SYSTEMS, AND COMPUTER READABLE MEDIA FOR POLICING ACCESS POINT NAME-AGGREGATE MAXIMUM BIT RATE (APN-AMBR) ACROSS PACKET DATA NETWORK GATEWAY DATA PLANE (P-GW DP) WORKER INSTANCES

(71) Applicant: Oracle International Corporation, Redwood Shores, CA (US)

(72) Inventor: Yesh Goel, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/102,404

(22) Filed: Nov. 23, 2020

(65) Prior Publication Data

US 2021/0105214 A1    Apr. 8, 2021

Related U.S. Application Data

(63) Continuation-in-part of application No. 16/697,021, filed on Nov. 26, 2019, which is a
(Continued)

(51) Int. Cl.
*H04L 12/813* (2013.01)
*H04L 47/20* (2022.01)
(Continued)

(52) U.S. Cl.
CPC .............. *H04L 47/20* (2013.01); *H04L 65/80* (2013.01); *H04W 72/0413* (2013.01);
(Continued)

(58) Field of Classification Search
CPC ..... H04L 47/20; H04L 65/80; H04L 65/1063; H04L 65/1033; H04L 47/10;
(Continued)

(56) References Cited

U.S. PATENT DOCUMENTS

| 5,381,413 | A | 1/1995 | Tobagi et al. |
| 6,748,435 | B1 | 6/2004 | Wang et al. |

(Continued)

FOREIGN PATENT DOCUMENTS

| CN | 105635345 B | 2/2019 |
| CN | 109788078 A | 5/2019 |

(Continued)

OTHER PUBLICATIONS

Notice of Publication for International Application Serial No. PCT/US2020/061885 (dated Jun. 3, 2021).

(Continued)

*Primary Examiner* — Michael Won
(74) *Attorney, Agent, or Firm* — Jenkins, Wilson, Taylor & Hunt, P.A.

(57) ABSTRACT

A method for policing APN-AMBR includes, at P-GW including plural P-GW DP worker instances: receiving, uplink data to be transmitted over a non-GBR bearer associated with a first PDN session from a first UE via an AP or downlink data to be transmitted over the non-GBR bearer to the first UE via the AP; forwarding the uplink or downlink data to a first P-GW DP worker instance of the plurality of P-GW DP worker instances that is assigned to the PDN session; and, at the first P-GW DP worker instance, transmitting, to an APN-AMBR policer separate from the P-GW, a request for a slice of APN-AMBR capacity for processing the uplink or downlink data. The method further includes, at the APN-AMBR policer: maintaining records of APN-AMBR capacity used by UEs having PDN sessions assigned to different ones of the P-GW DP worker instances; and granting or denying the request based on the APN-AMBR capacity used by the PDN sessions assigned to the different ones of the P-GW DP worker instances.

20 Claims, 9 Drawing Sheets

Related U.S. Application Data continuation-in-part of application No. 16/453,955, filed on Jun. 26, 2019, now Pat. No. 10,819,636.

(51) Int. Cl.
- *H04W 72/04* (2009.01)
- *H04L 65/80* (2022.01)
- *H04W 88/16* (2009.01)
- *H04W 76/18* (2018.01)

(52) U.S. Cl.
CPC ....... *H04W 72/0493* (2013.01); *H04W 76/18* (2018.02); *H04W 88/16* (2013.01)

(58) Field of Classification Search
CPC ............. H04W 72/0493; H04W 88/16; H04W 72/0413; H04W 76/18; H04W 28/0842
See application file for complete search history.

(56) References Cited

U.S. PATENT DOCUMENTS

| | | |
|---|---|---|
| 7,782,776 B2 | 8/2010 | Shankar et al. |
| 8,023,482 B2 | 9/2011 | Gong et al. |
| 8,300,637 B1 | 10/2012 | Bennett, III et al. |
| 8,645,565 B2 | 2/2014 | Sparks et al. |
| 8,811,228 B2 | 8/2014 | Lopez et al. |
| 8,879,431 B2 | 11/2014 | Ridel et al. |
| 8,954,080 B2 | 2/2015 | Janakiraman et al. |
| 9,246,762 B1 | 1/2016 | Watkins |
| 9,667,590 B2 | 5/2017 | Yan et al. |
| 10,097,504 B2 | 10/2018 | Backholm |
| 10,285,155 B1 | 5/2019 | Dodd-Noble et al. |
| 10,299,128 B1 | 5/2019 | Suthar et al. |
| 10,361,843 B1 | 7/2019 | Suthar et al. |
| 10,595,256 B1 | 3/2020 | Marupaduga et al. |
| 10,609,154 B2 | 3/2020 | Talebi Fard et al. |
| 10,616,934 B2 | 4/2020 | Talebi Fard et al. |
| 10,652,098 B2 | 5/2020 | Kim |
| 10,772,062 B1 | 9/2020 | Albasheir et al. |
| 10,778,527 B2 | 9/2020 | Assali et al. |
| 10,791,044 B1 | 9/2020 | Krishan et al. |
| 10,819,636 B1 | 10/2020 | Goel |
| 10,880,370 B2 | 12/2020 | Seenappa et al. |
| 2003/0174649 A1 | 9/2003 | Shankar et al. |
| 2003/0223414 A1 | 12/2003 | Wong |
| 2004/0003069 A1 | 1/2004 | Wong |
| 2004/0141473 A1 | 7/2004 | Buot |
| 2004/0208183 A1 | 10/2004 | Balachandran et al. |
| 2005/0193096 A1 | 9/2005 | Yu et al. |
| 2006/0010224 A1 | 1/2006 | Sekar et al. |
| 2007/0242738 A1 | 10/2007 | Park et al. |
| 2009/0055835 A1 | 2/2009 | Zhu |
| 2009/0141625 A1 | 6/2009 | Ghai et al. |
| 2009/0222584 A1 | 9/2009 | Josefsberg et al. |
| 2011/0078674 A1 | 3/2011 | Ershov |
| 2011/0202604 A1 | 8/2011 | Craig et al. |
| 2013/0029708 A1 | 1/2013 | Fox et al. |
| 2013/0039176 A1 | 2/2013 | Kanode et al. |
| 2013/0198269 A1 | 8/2013 | Fleischman et al. |
| 2013/0272123 A1 | 10/2013 | Lee et al. |
| 2014/0379901 A1 | 12/2014 | Tseitlin et al. |
| 2015/0016266 A1 | 1/2015 | Dumitrescu et al. |
| 2015/0071074 A1 | 3/2015 | Zaidi et al. |
| 2015/0263987 A1 | 9/2015 | Klein et al. |
| 2016/0142324 A1 | 5/2016 | Vihtari et al. |
| 2016/0156513 A1 | 6/2016 | Zhang et al. |
| 2016/0164788 A1 | 6/2016 | Goel et al. |
| 2016/0183156 A1* | 6/2016 | Chin .................. H04L 61/2007 370/331 |
| 2016/0234119 A1 | 8/2016 | Zaidi et al. |
| 2016/0315743 A1 | 10/2016 | Nagaraj et al. |
| 2016/0344635 A1* | 11/2016 | Lee ........................ H04L 47/20 |
| 2016/0352588 A1 | 12/2016 | Subbarayan et al. |
| 2017/0221015 A1 | 8/2017 | June et al. |
| 2018/0039494 A1 | 2/2018 | Lander et al. |
| 2018/0083882 A1 | 3/2018 | Krishan et al. |
| 2018/0159780 A1 | 6/2018 | Essigmann et al. |
| 2018/0183724 A1 | 6/2018 | Callard et al. |
| 2018/0213391 A1 | 7/2018 | Inoue |
| 2018/0262592 A1 | 9/2018 | Zandi et al. |
| 2018/0262625 A1 | 9/2018 | McCarley et al. |
| 2018/0285794 A1 | 10/2018 | Gray-Donald et al. |
| 2018/0324247 A1 | 11/2018 | Hood et al. |
| 2018/0324646 A1 | 11/2018 | Lee et al. |
| 2018/0343567 A1 | 11/2018 | Ashrafi |
| 2019/0007366 A1 | 1/2019 | Voegele et al. |
| 2019/0045351 A1 | 2/2019 | Zee et al. |
| 2019/0075552 A1 | 3/2019 | Yu et al. |
| 2019/0116486 A1 | 4/2019 | Kim et al. |
| 2019/0116521 A1 | 4/2019 | Qiao et al. |
| 2019/0140895 A1 | 5/2019 | Ennis, Jr. et al. |
| 2019/0158364 A1 | 5/2019 | Zhang et al. |
| 2019/0173740 A1 | 6/2019 | Zhang et al. |
| 2019/0174561 A1 | 6/2019 | Sivavakeesar |
| 2019/0182875 A1 | 6/2019 | Talebi Fard et al. |
| 2019/0191348 A1 | 6/2019 | Futaki et al. |
| 2019/0191467 A1 | 6/2019 | Dao et al. |
| 2019/0222633 A1 | 7/2019 | Howes et al. |
| 2019/0223093 A1 | 7/2019 | Watfa et al. |
| 2019/0230556 A1 | 7/2019 | Lee |
| 2019/0261244 A1 | 8/2019 | Jung et al. |
| 2019/0268270 A1 | 8/2019 | Fattah |
| 2019/0306251 A1 | 10/2019 | Talebi Fard et al. |
| 2019/0306907 A1 | 10/2019 | Andreoli-Fang et al. |
| 2019/0313236 A1 | 10/2019 | Lee et al. |
| 2019/0313437 A1 | 10/2019 | Jung et al. |
| 2019/0313469 A1 | 10/2019 | Karampatsis et al. |
| 2019/0335002 A1 | 10/2019 | Bogineni et al. |
| 2019/0335534 A1 | 10/2019 | Atarius et al. |
| 2019/0342229 A1 | 11/2019 | Khinvasara et al. |
| 2019/0342921 A1 | 11/2019 | Loehr et al. |
| 2019/0349901 A1 | 11/2019 | Basu Mallick et al. |
| 2019/0357092 A1 | 11/2019 | Jung et al. |
| 2019/0380031 A1 | 12/2019 | Suthar et al. |
| 2019/0394284 A1 | 12/2019 | Baghel et al. |
| 2019/0394624 A1 | 12/2019 | Karampatsis et al. |
| 2019/0394833 A1 | 12/2019 | Talebi Fard et al. |
| 2020/0007632 A1 | 1/2020 | Landais et al. |
| 2020/0008069 A1 | 1/2020 | Zhu et al. |
| 2020/0028920 A1 | 1/2020 | Livanos et al. |
| 2020/0045753 A1 | 2/2020 | Dao et al. |
| 2020/0045767 A1 | 2/2020 | Velev et al. |
| 2020/0053670 A1 | 2/2020 | Jung et al. |
| 2020/0053724 A1 | 2/2020 | MolavianJazi et al. |
| 2020/0053828 A1 | 2/2020 | Bharatia et al. |
| 2020/0059420 A1 | 2/2020 | Abraham |
| 2020/0059856 A1 | 2/2020 | Cui et al. |
| 2020/0084663 A1 | 3/2020 | Park et al. |
| 2020/0092423 A1 | 3/2020 | Qiao et al. |
| 2020/0092424 A1 | 3/2020 | Qiao et al. |
| 2020/0127916 A1 | 4/2020 | Krishan |
| 2020/0136911 A1 | 4/2020 | Assali et al. |
| 2020/0137174 A1 | 4/2020 | Stammers et al. |
| 2020/0177629 A1 | 6/2020 | Hooda et al. |
| 2020/0313996 A1 | 10/2020 | Krishan et al. |
| 2020/0404608 A1 | 12/2020 | Albasheir et al. |
| 2020/0412597 A1 | 12/2020 | Goel et al. |
| 2021/0000723 A1 | 1/2021 | Strand et al. |
| 2021/0007023 A1 | 1/2021 | Umapathy et al. |
| 2021/0044481 A1 | 2/2021 | Xu et al. |
| 2021/0067480 A1 | 3/2021 | Goel |
| 2021/0067485 A1 | 3/2021 | Goel |

FOREIGN PATENT DOCUMENTS

| | | |
|---|---|---|
| EP | 2 575 303 A1 | 4/2013 |
| WO | WO 2017/143915 A1 | 8/2017 |
| WO | WO 2018/174021 A1 | 9/2018 |
| WO | WO 2018/174516 A1 | 9/2018 |
| WO | WO 2019/034609 A1 | 2/2019 |
| WO | WO 2019/062596 A1 | 4/2019 |
| WO | WO 2019/076273 A1 | 4/2019 |
| WO | WO 2019/144321 A1 | 8/2019 |
| WO | WO 2019/220172 A1 | 11/2019 |

(56) References Cited

FOREIGN PATENT DOCUMENTS

| WO | WO 2020/091934 A1 | 5/2020 |
| WO | WO 2020/263486 A1 | 12/2020 |
| WO | WO 2021/040827 A1 | 3/2021 |
| WO | WO 2021/055998 A1 | 3/2021 |

OTHER PUBLICATIONS

Notice of Allowance and Fee(s) Due for U.S. Appl. No. 17/001,599 (dated May 17, 2021).

Advisory Action for U.S. Appl. No. 16/697,021 (dated May 7, 2021).

Applicant-Initiated Interview Summary for U.S. Appl. No. 17/001,599 (dated May 5, 2021).

Notification of Transmittal of the International Search Report and the Written Opinion of the International Searching Authority, or the Declaration for International Application Serial No. PCT/US2020/065765 (dated Apr. 15, 2021).

Ex Parte Quayle Action for U.S. Appl. No. 16/730,799 (Apr. 7, 2021).

Notice of Allowance and Fee(s) Due for U.S. Appl. No. 16/555,817 (dated Mar. 24, 2021).

International Search Report and Written Opinion for Patent Cooperation Treaty Application Serial No. PCT/US2020/061885 (dated Feb. 4, 2021).

International Search Report and Written Opinion for Patent Cooperation Treaty Application Serial No. PCT/US2020/057712 (dated Feb. 2, 2021).

Cheshire, S. et al., "Apple's DNS Long-Lived Queries protocol draft-sekar-dns-llq-06," Internet Engineering Task Force (IETF), pp. 1-26 (Aug. 23, 2019).

Final Office Action for U.S. Appl. No. 16/697,021 (dated Feb. 2, 2021).

Applicant-Initiated Interview Summary for U.S. Appl. No. 16/697,021 (dated Jan. 26, 2021).

Advisory Action for U.S. Appl. No. 16/356,446 (dated Dec. 22, 2020).

Notice of Allowance and Fee(s) Due for U.S. Appl. No. 16/555,817 (dated Dec. 3, 2020).

Commonly-assigned, co-pending U.S. Appl. No. 17/156,149 for "Methods, Systems, and Computer Readable Media for Optimized Routing of Messages Relating to Existing Network Function (NF) Subscriptions Using an Intermediate Forwarding NF Repository Function (NRF)," (Unpublished, filed Nov. 9, 2020).

Commonly-assigned, co-pending U.S. Appl. No. 17/082,871 for "Methods, Systems, and Computer Readable Media for Rank Processing for Network Function Selection," (Unpublished, filed Oct. 28, 2020).

Commonly-assigned, co-pending Continuation-in-Part U.S. Appl. No. 17/074,553 for "Methods, Systems, and Computer Readable Media for Actively Discovering and Tracking Addresses Associated with 4G Service Endpoints," (Unpublished, filed Oct. 19, 2020).

Non-Final Office Action for U.S. Appl. No. 16/697,021 (dated Sep. 29, 2020).

Final Office Action for U.S. Appl. No. 16/356,446 (dated Sep. 8, 2020).

Notice of Allowance and Fee(s) Due and Examiner-Initiated Interview Summary for U.S. Appl. No. 16/453,955 (dated Aug. 26, 2020).

Notification of the Transmittal of the International Search Report and the Written Opinion of the International Searching Authority, or the Declaration for International Application No. PCT/US2020/034723 (dated Aug. 17, 2020).

Non-Final Office Action for U.S. Appl. No. 16/555,817 (dated Aug. 7, 2020).

Commonly-assigned, co-pending U.S. Appl. No. 16/945,794 for "Methods, Systems, And Computer Readable Media For Preferred Network Function (NF) Location Routing Using Service Communications Proxy (SCP)," (Unpublished, filed Jul. 31, 2020).

Notification of Transmittal of the International Search Report and the Written Opinion of the International Searching Authority, or the Declaration for International Application Serial No. PCT/US2020/035004 (dated Jul. 7, 2020).

"3rd Generation Partnership Project; Technical Specification Group Core Network and Terminals; 5G System; Network Function Repository Services; Stage 3 (Release 16)," 3GPP TS 29.510 V16.4.0, pp. 1-206 (Jul. 2020).

Notice of Allowance and Fee(s) Due for U.S. Appl. No. 16/369,691 (dated May 12, 2020).

Non-Final Office Action for U.S. Appl. No. 16/356,446 (dated May 11, 2020).

Notice of Allowance and Fee(s) Due for U.S. Appl. No. 16/176,920 (dated Apr. 16, 2020).

Applicant-Initiated Interview Summary for U.S. Appl. No. 16/176,920 (dated Apr. 1, 2020).

Non-Final Office Action for U.S. Appl. No. 16/176,920 (dated Mar. 6, 2020).

"3rd Generation Partnership Project; Technical Specification Group Services and System Aspects; Procedures for the 5G System (5GS); Stage 2 (Release 16)," 3GPP TS 23.502 V16.4.0, pp. 1-582 (Mar. 2020).

"3rd Generation Partnership Project; Technical Specification Group Services and System Aspects; System architecture for the 5G System (5GS); Stage 2 (Release 16)," 3GPP TS 23.501 V16.4.0, pp. 1-430 (Mar. 2020).

Notification of Transmittal of the International Search Report and the Written Opinion of the International Searching Authority, or the Declaration for International Application Serial No. PCT/US2019/053912 (dated Dec. 18, 2019).

Commonly-assigned, co-pending U.S. Appl. No. 16/697,021 for "Methods, Systems, and Computer Readable Media for Diameter-Peer-Wide Egress Rate Limiting at Diameter Relay Agent (DRA)," (Unpublished, filed Nov. 27, 2019).

"5G; System architecture for the 5G System (5GS) (3GPP TS 23.501 version 15.6.0 Release 15)," ETSI TS 123 501, V15.6.0, pp. 1-168 (Oct. 2019).

"5G; 5G System; Network function repository services; Stage 3 (3GPP TS 29.510 version 15.5.1 Release 15)," ETSI TS 129 510, V15.5.1, pp. 1-132 (Oct. 2019).

"3rd Generation Partnership Project; Technical Specification Group Core Network and Terminals; 5G Systems; Network Function Repository Services; Stage 3 (Release 16)," 3GPP TS 29.510 V.16.1.1, pp. 1-150 (Oct. 2019).

"3rd Generation Partnership Project; Technical Specification Group Core Network and Terminals; 5G System; Technical Realization of Service Based Architecture; Stage 3 (Release 16)," 3GPP TS 29.500 V16.1.0, pp. 1-43 (Sep. 2019).

"3rd Generation Partnership Project; Technical Specification Group Service and System Aspects; System Architecture for the 5G System (5GS); Stage 2 (Release 16)," 3GPP TS 23.501 V16.2.0, pp. 1-391 (Sep. 2019).

"3rd Generation Partnership Project; Technical Specification Group Services and System Aspects; Architecture enhancements to facilitate communications with packet data networks and applications (Release 16)," 3GPP TS 23.682, V16.4.0, pp. 1-30 (Sep. 2019).

"5G; 5G System; Technical Realization of Service Based Architecture; Stage 3 (3GPP TS 29.500 version 15.5.0 Release 15)," ETSI TS 129 500, V15.5.0, pp. 1-40 (Sep. 2019).

Cheshire et al., "Apple's DNS Long-Lived Queries protocol," Network Working Group, Apple, Inc., pp. 1-26 (Aug. 22, 2019).

"Diameter and Diameter Applications," Alcatel-Lucent, http://infodoc.alcatel-lucent.com/html/0_add-h-f/93-0098-HTML/7750_SR_OS_Triple_Play_Guide/GX-PolicyMgmt.html, pp. 1-40 (Aug. 22, 2019).

"3rd Generation Partnership Project; Technical Specification Group Radio Access Network; NG-RAN; NG Application Protocol (NGAP) (Release 15)," 3GPP TS 38.413, V15.4.0, pp. 1-328 (Jul. 2019).

Commonly-assigned, co-pending U.S. Appl. No. 16/453,955 for "Methods, Systems, and Computer Readable Media for Producer Network Function (NF) Service Instance Wide Egress Rate Limiting at Service Communication Proxy (SCP)," (Unpublished, filed Jun. 26, 2019).

(56) References Cited

OTHER PUBLICATIONS

"3rd Generation Partnership Project; Technical Specification Group Core Network and Terminals; 5G System; Network Function Repository Services; Stage 3 (Release 16)," 3GPP TS 29.510, V16.0.0, pp. 1-135 (Jun. 2019).

"3rd Generation Partnership Project; Technical Specification Group Core Network and Terminals; 5G System; Restoration Procedures (Release 16)," 3GPP TS 23.527, V16.0.0, pp. 1-19 (Jun. 2019).

"3rd Generation Partnership Project; Technical Specification Group Core Network and Terminals; Numbering, addressing and identification (Release 15)," 3GPP TS 23.003, V15.7.0, pp. 1-131 (Jun. 2019).

"Class of Service Feature Guide (Routers and EX9200 Switches)," Junos® OS, Juniper Networks, pp. 1-1530 (Apr. 10, 2019).

"3rd Generation Partnership Project; Technical Specification Group Services and System Aspects; System Architecture and 5G; Stage 2 (Release 16)," 3GPP TS 23.501, V16.0.0, pp. 1-318 (Mar. 2019).

Penttinen, "5G Explained: Security and Deployment of Advanced Mobile Communications," Chapter 6, Section 6.3.8 NRF, 2 pages (Feb. 2019).

"Oracle Communications Diameter Signaling Router," Release Notice, Release 8.3, E93179 Revision 02, Oracle, pp. 1-98 (Dec. 2018).

"3rd Generation Partnership Project; Technical Specification Group Network and Terminals; 5G Systems; Network Function Repository Services; Stage 3 (Release 15)," 3GPP TS 29.510, V15.2.0, pp. 1-113 (Dec. 2018).

"3rd Generation Partnership Project; Technical Specification Group Network and Terminals; 5G Systems; Principles and Guidelines for Services Definition; Stage 3 (Release 15)," 3GPP TS 29.501, V15.2.0, pp. 1-66 (Dec. 2018).

"Addressing 5G Network Function Requirements," Intel® FPGAs and Intel PAC 5G QoS and IPSec Benchmarking, White Paper, pp. 1-8 (Oct. 2018).

"5G; 5G System; Technical Realization of Service Based Architecture; Stage 3 (3GPP TS 29.500 version 15.0.0 Release 15)," ETSI TS 129 500, V15.0.0, pp. 1-29 (Jul. 2018).

"3rd Generation Partnership Project; Technical Specification Group Services and System Aspects; Study on Enhancements to the Service-Based Architecture (Release 16)," 3GPP TR 23.742, V0.3.0, pp. 1-64 (Jul. 2018).

"3rd Generation Partnership Project; Technical Specification Group Services and System Aspects; Study on Enhancements to the Service-Based Architecture (Release 16)," 3GPP TR 23.742, V0.2.0, pp. 1-39 (Jun. 2018).

"5G; Procedures for the 5G System (3GPP TS 23.502 version 15.2.0 Release 15)," ETSI TS 123 502 V15.2.0, pp. 1-46 (Jun. 2018).

"Cisco Ultra 5G Packet Core Solution," Cisco, White paper, https://www.cisco.com/c/dam/en/us/products/collateral/routers/network-convergence-system-500-series-routers/white-paper-c11-740360.pdf, pp. 1-11 (2018).

Li et al., "Mobile Edge Computing Platform Deployment in 4G LTE Networks: A Middlebox Approach," https://www.usenix.org/system/files/conference/hotedge18/hotedge18-papers-li.pdf, 6 pages (2018).

Scholl et al., "An API First Approach to Microservices Development," Oracle, https://blogs.oracle.com/developers/an-api-first-approach-to-microservices-development, pp. 1-12 (Nov. 8, 2017).

Brown et al., "Service-Based Architecture for 5G Core Networks," Huawei, Heavy Reading, https://www.3g4g.co.uk/5G/5Gtech_6004_2017_11_Service-Based-Architecture-for-5G-Core-Networks_HR_Huawei.pdf, pp. 1-12 (Nov. 2017).

"3rd Generation Partnership Project; Technical Specification Group Services and System Aspects; System Architecture for the 5G System; Stage 2 (Release 15)," 3GPP TS 23.501, V1.5.0, pp. 1-170 (Nov. 2017).

"Pseudo-CR on Service Discovery and Registration using NRF service," Ericsson, 3GPP TSG CT4 Meeting #79, 3GPP TR 29.891—v0.3.0, pp. 1-4 (Aug. 21-25, 2017).

Carlton et al., "HTTP and DNS in a 5G World," https://www.computerworld.com/article/3204594/http-and-dns-in-a-5g-world.html, pp. 1-5 (Jun. 30, 2017).

Benacer et al., "A High-Speed Traffic Manager Architecture for Flow-Based Networking," pp. 1-4 (2017).

"Dynamically Reconfigurable Optical-Wireless Backhaul/Fronthaul with Cognitive Control Plane for Small Cells and Cloud-RANs: D3.1 Analysis of state of the art on scalable control plane design and techniques for user mobility awareness. Definition of 5G-XHaul control plane requirements," European Commission, 5G-XHaul, pp. 1-107 (Jun. 31, 2016).

"3rd Generation Partnership Project; Technical Specification Group Core Network and Terminals; Domain Name System Procedures; Stage 3 (Release 13)," 3GPP TS 29.303 V13.4.0, pp. 1-69 (Jun. 2016).

"Multi-Layer Security Protection for Signaling Networks," Oracle Communications, Oracle white paper, pp. 1-9 (Jan. 2016).

Kantola et al., "Policy-based communications for 5G mobile with customer edge switching," Security and Communication Networks, vol. 9, pp. 3070-3082 (2016).

Fielding et al. "Hypertext Transfer Protocol (HTTP/1.1): Semantics and Content", Internet Engineering Taskforce (IETF) Request for Comments: 7231, IEFT RFC 7231, pp. 1-102 (Jun. 2014).

Abley et al., "A Mechanism for Remote-Triggered DNS Cache Flushes (DNS Flush)," Network Working Group, Google, pp. 1-12 (Jun. 24, 2013).

Preston-Werner, "Semantic Versioning 2.0.0", Oracle, pp. 1-5 (Jun. 2013).

"LTE and Beyond," https://ytd2525.wordpress.com/2013/03/06/lte-and-beyond/, 3 pages (2013).

Fajardo et al., "Diameter Based Protocol," Internet Engineering Task Force (IETF) Request for Comments: 6733, pp. 1-152 (Oct. 2012).

Gulbrandsen et al., "A DNS RR for specifying the location of services (DNS SRV)," RFC 2782, pp. 1-12 (Feb. 2000).

Nichols et al., "Definition of the Differentiated Services Field (DS Field) in the IPv4 and IPv6 Headers," Internet Engineering Task Force (IEFT) Netwok Working Group Request for Comments (RFC) 2474, The Internet Society, pp. 1-20 (Dec. 1998).

"P-GW Administration Guide, StarOS Release 21.20," Cisco, pp. 1-1164 (Oct. 11, 2020).

"3rd Generation Partnership Project; Technical Specification Group Core Network and Terminals; Non-Access-Stratum (NAS) protocol for Evolved Packet System (EPS); Stage 3 (Release 17)," 3GPP TS 24.301, V17.0.0, pp. 1-585 (Sep. 2020).

3rd Generation Partnership Project; Technical Specification Group Services and System Aspects; Architecture enhancements to facilitate communications with packet data networks and applications (Release 16), 3GPP TS 23.682, V16.8.0, pp. 1-135 (Sep. 2020).

\* cited by examiner

METHODS, SYSTEMS, AND COMPUTER READABLE MEDIA FOR POLICING ACCESS POINT NAME-AGGREGATE MAXIMUM BIT RATE (APN-AMBR) ACROSS PACKET DATA NETWORK GATEWAY DATA PLANE (P-GW DP) WORKER INSTANCES

PRIORITY CLAIM

This application is a continuation-in-part of U.S. patent application Ser. No. 16/697,021 filed on Nov. 26, 2019, which is a continuation-in-part of U.S. patent application Ser. No. 16/453,955 filed on Jun. 26, 2019, the disclosure of which is incorporated herein by reference in its entirety.

TECHNICAL FIELD

The subject matter described herein relates to policing uplink and downlink APN-AMBR. More particularly, the subject matter described herein relates to methods, systems, and computer readable media for policing uplink and downlink APN-AMBR for PDN sessions assigned to different P-GW DP worker instances.

BACKGROUND

In 3GPP communications networks, the PDN gateway or P-GW is the gateway that terminates the SGi interface towards the PDN. The PDN gateway performs various functions that are defined in 3GPP TS 23.401. These functions include per-user-based packet filtering, lawful interception, UE IP address allocation, transport level packet marking in both the uplink and downlink directions, accounting for inter-operator charging, uplink and downlink service level charging, interfacing with the offline charging system (OFCS), uplink and downlink service level gating and rate enforcement, uplink and downlink rate enforcement based on APN-AMBR, as well as other functions. It is the uplink and downlink rate enforcement based on APN-AMBR to which the subject matter described herein is directed.

APN-AMBR is the aggregate maximum bit rate usable by all PDN sessions assigned to non-guaranteed bit rate (non-GBR) bearers that use a given access point. One network architecture for a P-GW includes P-GW DP worker instances that are assigned to handle PDN sessions. In this architecture, all PDN sessions for the same UE through a single access point are required to be assigned to the same P-GW DP worker instance so that the P-GW DP worker instance can police all uplink and downlink bandwidth utilization by the UE through the particular access point. As a result, even if another P-GW DP worker instance has available processing capacity, new sessions for the same UE will be rejected.

Accordingly, in light of these difficulties, there exists a need for improved methods, systems, and computer readable media for policing APN-AMBR across P-GW DP worker instances.

SUMMARY

A method for policing access point name aggregated maximum bit rate (APN-AMBR) includes, at a packet data network (PDN) gateway (P-GW) including at least one processor and a plurality of P-GW data plane (DP) worker instances implemented by the at least one processor: receiving, uplink data to be transmitted over a non-guaranteed bit rate (non-GBR) bearer associated with a first PDN session from a first user equipment (UE) via an access point (AP) or downlink data to be transmitted over the non-GBR bearer to the first UE via the AP; forwarding the uplink or downlink data to a first P-GW DP worker instance of the plurality of P-GW DP worker instances that is assigned to the PDN session; and, at the first P-GW DP worker instance, transmitting, to an APN-AMBR policer separate from the P-GW, a request for a slice of APN-AMBR capacity for processing the uplink or downlink data. The method further includes, at the APN-AMBR policer: maintaining records of APN-AMBR capacity used by UEs having PDN sessions assigned to different ones of the P-GW DP worker instances; and granting or denying the request based on the APN-AMBR capacity used by the PDN sessions assigned to the different ones of the P-GW DP worker instances.

According to another aspect of the subject matter described herein, granting or denying the request includes granting the request and the method for APN-AMBR policing further includes, at the APN-AMBR policer, communicating notification of the grant to the first P-GW DP worker instance and, at the first P-GW DP worker instance, receiving the notification of the grant and consuming the slice of APN-AMBR capacity represented by the grant by transmitting the uplink or downlink data.

According to another aspect of the subject matter described herein, maintaining records of the APN-AMBR capacity used by the UEs includes maintaining records of the APN-AMBR capacity used by PDN sessions of the first UE that are assigned to the different ones of the P-GW DP worker instances.

According to another aspect of the subject matter described herein, maintaining records of the APN-AMBR capacity used by the UEs includes maintaining records of the APN-AMBR capacity used by different PDN sessions of different UEs that are assigned to the different ones of the P-GW DP worker instances.

According to another aspect of the subject matter described herein, transmitting the request for the slice of the APN-AMBR capacity includes requesting an allocation of tokens from the APN-AMBR policer for processing at least some of the uplink or downlink data.

According to another aspect of the subject matter described herein, requesting an allocation of tokens includes requesting the allocation of tokens in response to a percentage of granted tokens available to the first P-GW DP worker instance being less than a threshold amount.

According to another aspect of the subject matter described herein, the method for APN-AMBR policing includes, at the APN-AMBR policer, maintaining, for a plurality of UE-APN combinations, a maximum limit of tokens that can be allocated in a time interval and granting or denying the request for allocation of tokens based on whether a number of tokens requested by the request for allocation of tokens would cause the maximum limit of tokens to be exceeded, and the maximum limit of tokens is based on the APN-AMBR.

According to another aspect of the subject matter described herein, the method for APN-AMBR policing includes implementing a fixed or a sliding window during which tokens can be granted.

According to another aspect of the subject matter described herein, granting or denying the request includes implementing best effort token allocation wherein if a number of tokens requested by the first P-GW DP worker instance during a time interval would cause the maximum allocated tokens during the time interval to be exceeded, granting a remainder of tokens available in the time interval that would not cause the maximum limit of tokens to be exceeded.

According to another aspect of the subject matter described herein, granting or denying the request includes implementing max limit token allocation by denying a request for allocation of tokens if a requested number of tokens would cause the maximum limit of tokens to be exceeded.

According to another aspect of the subject matter described herein, a system for policing access point name aggregated maximum bit rate (APN-AMBR) is provided. The system includes a packet data network (PDN) gateway (P-GW) including at least one processor and a plurality of P-GW data plane (DP) worker instances implemented by the at least one processor, wherein the P-GW is configured to receive, uplink data to be transmitted over a non-guaranteed bit rate (non-GBR) bearer associated with a first PDN session from a first user equipment (UE) via an access point (AP) or downlink data to be transmitted over the non-GBR bearer to the first UE via the AP, forward the uplink or downlink data to a first P-GW DP worker instance of the plurality of P-GW DP worker instances that is assigned to the PDN session, and the first P-GW DP worker instance is configured to request a slice of APN-AMBR capacity for processing the uplink or downlink data. The system further includes, an APN-AMBR policer configured to maintain records of APN-AMBR capacity used by UEs having PDN sessions assigned to different ones of the P-GW DP worker instances, and grant or deny the request based on the APN-AMBR capacity used by the PDN sessions assigned to the different ones of the P-GW DP worker instances.

According to another aspect of the subject matter described herein, the APN-AMBR policer is configured to grant the request, communicate notification of the grant to the first P-GW DP worker instance, and wherein the first P-GW DP worker instance is configured to receive the notification of the grant and consume the slice of APN-AMBR capacity represented by the grant by transmitting the uplink or downlink data.

According to another aspect of the subject matter described herein, the APN-AMBR policer is configured to maintain records of the APN-AMBR capacity used by PDN sessions of the first UE that are assigned to the different ones of the P-GW DP worker instances.

According to another aspect of the subject matter described herein, the APN-AMBR policer is configured to maintain records of the APN-AMBR capacity used by different PDN sessions of different UEs that are assigned to the different ones of the P-GW DP worker instances.

According to another aspect of the subject matter described herein, the first P-GW DP worker instance is configured to request the slice of APN-AMBR capacity by requesting an allocation of tokens from the APN-AMBR policer for processing at least some of the uplink or downlink data.

According to another aspect of the subject matter described herein, the first P-GW DP worker instance is configured to request the allocation of tokens in response to a percentage of granted tokens available to the first P-GW DP worker instance being less than a threshold amount.

According to another aspect of the subject matter described herein, the APN-AMBR policer is configured to maintain a maximum limit of tokens that can be allocated in a time interval and to grant or deny the request for allocation of tokens based on whether a number of tokens requested by the request for allocation of tokens would cause the maximum limit of tokens to be exceeded, and the maximum limit of tokens is based on the APN-AMBR.

According to another aspect of the subject matter described herein, the APN-AMBR policer is configured to implement best effort token allocation wherein if a number of tokens requested by the first P-GW DP worker instance during a time interval would cause the maximum allocated tokens during the time interval to be exceeded, grant a remainder of tokens available in the time interval that would not cause the maximum limit of tokens to be exceeded, and the maximum limit of tokens is based on the APN-AMBR.

According to another aspect of the subject matter described herein, the APN-AMBR policer is configured to implement max limit token allocation by denying a request for allocation of tokens if a requested number of tokens would cause the maximum limit of tokens to be exceeded and the maximum limit is based on the APN-AMBR.

According to another aspect of the subject matter described herein, a non-transitory computer readable medium having stored thereon executable instructions that when executed by at least one processor of at least one computer control the at least one computer to perform steps is provided. The steps include, at a packet data network (PDN) gateway (P-GW) including a plurality of P-GW data plane (DP) worker instances: receiving, uplink data to be transmitted over a non-guaranteed bit rate (non-GBR) bearer associated with a first PDN session from a first user equipment (UE) via an access point (AP) or downlink data to be transmitted over the non-GBR bearer to the first UE via the AP; forwarding the uplink or downlink data to a first P-GW DP worker instance of the plurality of P-GW DP worker instances that is assigned to the PDN session. The steps further include, at the first P-GW DP worker instance, transmitting, to an APN-AMBR policer separate from the P-GW, a request for a slice of APN-AMBR capacity for processing the uplink or downlink data. The steps further include at the APN-AMBR policer: maintaining records of APN-AMBR capacity used by UEs having PDN sessions assigned to different ones of the P-GW DP worker instances; and granting or denying the request based on the APN-AMBR capacity used by the PDN sessions assigned to the different ones of the P-GW DP worker instances.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

The subject matter described herein relates to methods, systems, and computer readable media for allocating APN-AMBR capacity at a P-GW. As stated above, one problem with existing network architectures is that PDN sessions for a given APN are required to be assigned to the same P-GW DP worker instance so that APN-AMBR can be enforced, which can result in a PDN session being denied due to capacity limits of the P-GW DP worker instance, even when another P-GW DP worker instance is available to handle a session. To solve this problem without unduly complicating the architecture of P-GW DP worker instances, an APN-AMBR policer separate from the P-GW may implement APN-AMBR capacity allocation and rate limiting policing of uplink and downlink PDN sessions.

Figure 1:
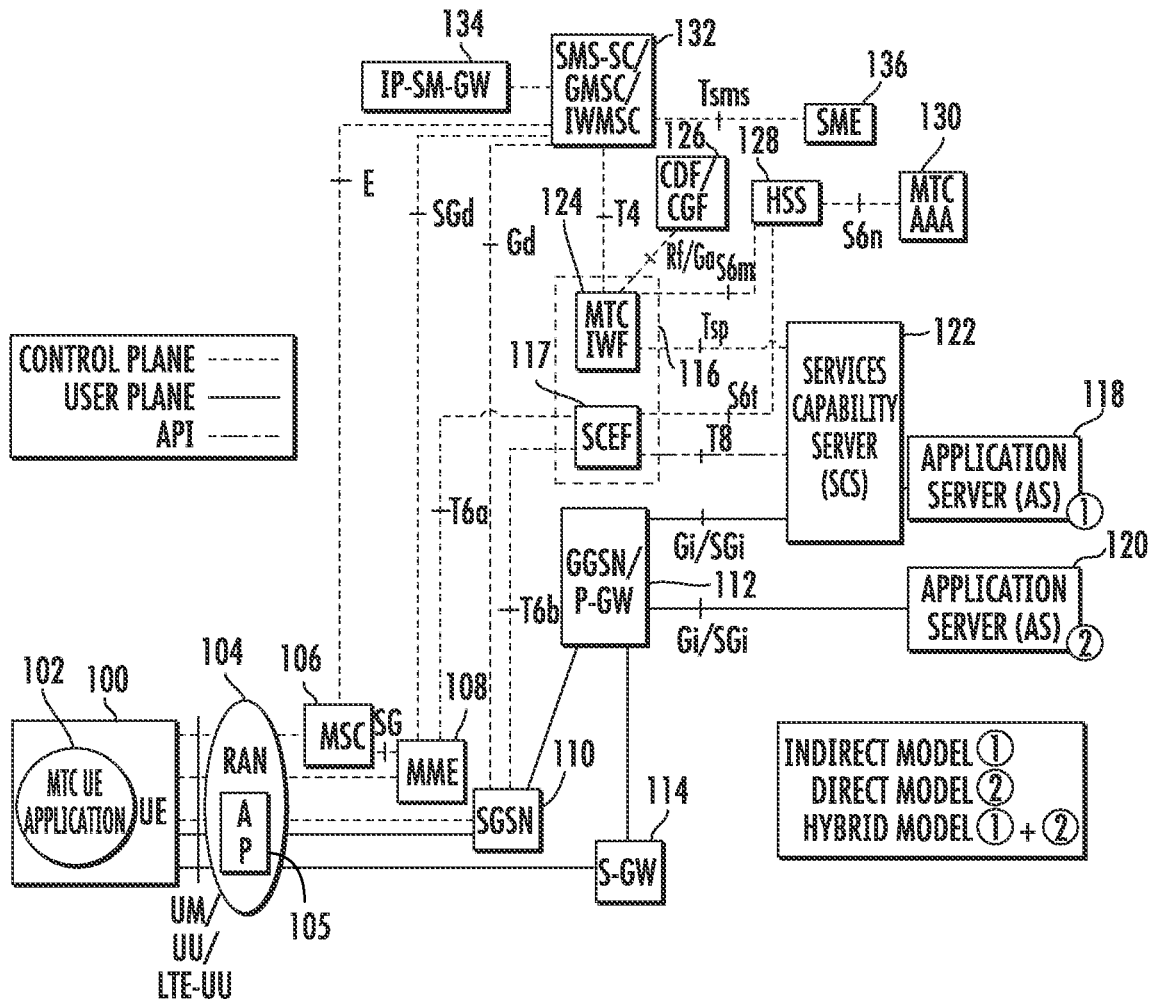
FIG. 1 is a network diagram illustrating an exemplary network architecture including a P-GW and an access point (AP) served by the P-GW.

In order to more fully explain APN-AMBR bandwidth allocation and policing by the APN-AMBR policer, a background on the network architecture will first be presented. FIG. 1 is a block diagram illustrating an exemplary 3GPP network architecture. The architecture illustrated in FIG. 1 is defined in 3GPP TS 23.682. In FIG. 1, the architecture includes user equipment (UE) 100, which may include machine type communications (MTC) UE applications 102. Thus, UE 100 may be an IoT device, such as a sensor, or a mobile handset used by a network subscriber.

UE 100 connects to the core network via radio access network (RAN) 104. RAN 104 may be the evolved universal terrestrial radio access network (E-UTRAN), the new radio (NR) network, or a combination thereof. The node in radio access network 104 that provides radio connectivity to 2G and 3G UE devices is referred to as the base station. For 4G UEs, the node in radio access network 104 that provides radio network connectivity to the UEs is referred to as the evolved node B (eNB). For 5G-capable UEs, the node that provides NR connectivity to the devices is referred to as the gNode B (gNB). RAN 104 is intended to represent one or more base stations, eNBs, and gNBs.

Another way in which UE 100 can access the network is through an access point 105. Access point 105 may be a Wi-Fi access point or other type of access point through which UE 100 has packet data network connectivity with network nodes, such as application server 120.

Mobile switching center (MSC) 106 performs mobility management functions for 2G and 3G UE devices. Mobility management entity (MME) 108 performs mobility management functions for 4G capable UE devices. Mobility management functions performed by MSC 106 or MME 108 may include receiving mobile device registrations, communicating mobile subscriber registration and location information to home location register (HLR) or home subscriber service (HSS), and communicating with the nodes in RAN 104 through which UEs are attached to the network.

Serving general packet radio service support node (SGSN) 110 handles packet data communications with mobile users in the network. SGSN 110 functions as the service access point to the GPRS network for the mobile user.

On the other side, SGSN 110 communicates with gateway GPRS support node/PDN gateway (GGSN/P-GW) 112, which can function as the policy enforcement point for packet data communications with mobile users. A policy and charging rules function (PCRF) (not shown in FIG. 1) may perform policy and charging functions for mobile users. The PCRF may include a policy data store that stores policies to be applied to mobile users. The policies may be installed in a policy enforcement point, such as GGSN/P-GW 112 to enforce policies for network usage and charging. A signaling gateway (SGW) 114 performs signaling protocol conversions to set up bearer communications with mobile users.

SCEF 116 includes a SCEF function 117 and a machine type communications interworking function (MTC-IWF) 124. SCEF function 117, on the application side, provides an interface for application servers, such as application servers (ASs) 118 and 120 and service capability server (SCS) 122 to communicate with the network. SCEF 116, in one example, is the node that supports group triggering of IoT devices by application servers 118 and 120 and by service capability server 122. In a direct communication model, application servers 118 and 120 may communicate directly with GGSN/P-GW 112. In an indirect communication model, application servers 118 and 120 may communicate with the network via SCS 122 and SCEF 116. It should also be noted that application servers 118 and 120 may communicate directly with SCEF 116.

GGSN/P-GW 112 will hereinafter be referred to as P-GW 112, as the bandwidth policing functions performed by P-GW 112 are of interest to the subject matter described herein. One such function is the policing of aggregate maximum bit rate. Aggregate maximum bit rate or AMBR is the bit rate towards a particular PDN that is shared among PDN users. Because the bit rate is shared, it is desirable to police the bit rate on a per user basis. One method for policing the bit rate is on a per-APN, per-UE basis, so that each UE and AP combination is allocated a portion of the AMBR up to a maximum portion. When the UE-APN combination reaches the maximum AMBR, further PDU sessions for that particular UE will be denied. As will be described in more detail below, the subject matter described herein includes an APN-AMBR policer that allows PDN sessions for a UE and ABN combination to be distributed across multiple P-GW DP worker instances.

MTC-IWF 124 facilitates communication with IoT devices that do not have IP communications capabilities. A charging data function/charging gateway function (CDF/

CGF) 126 generates billing records for network usage. A home subscriber server (HSS) 128 stores subscription and location information for UE devices. In one example, HSS 128 may also be configured with mappings used by SCEF 116 or another node to translate an external group ID into individual IoT device identifiers, such as international mobile subscriber identifiers (IMSIs). A machine type communications authentication authorization and accounting (MTC AAA) server 130 performs AAA functions for MTC devices.

The network architecture may include a short message service center/gateway message service center/interworking message service center (SMSC/GMSC/IWMSC) 132 for generating and delivering SMS messages to IoT devices. An IP short message gateway (IP-SM-GW) 134 may convert IP messages to SMS messages and vice versa. A short message entity (SME) 136 sends and receives SMS messages.

Figure 2:
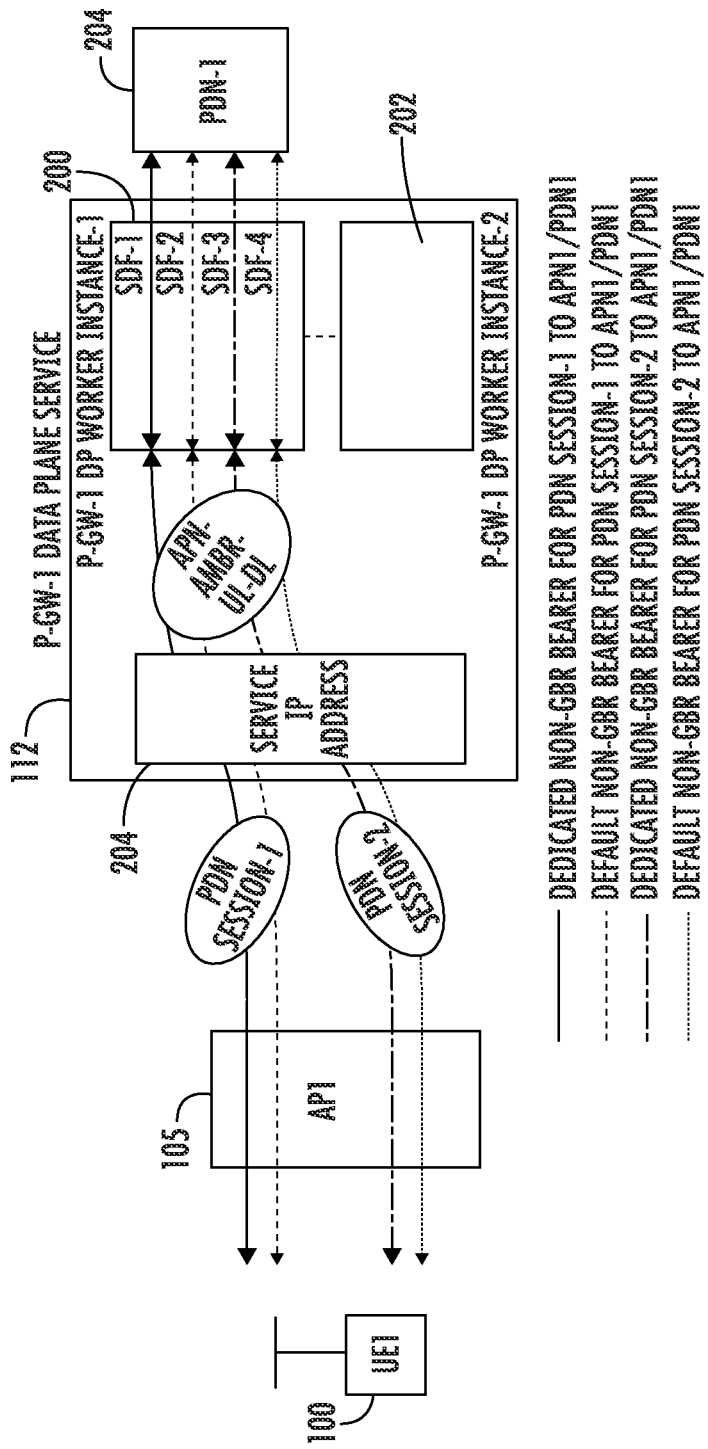
FIG. 2 is a network diagram illustrating a P-GW providing data plane service for multiple PDN sessions where all PDN sessions for a given UE and APN are assigned to the same P-GW DP worker instance.

As stated above, one problem with the current P-GW architecture is that in order to properly police AGBR limits, all PDN sessions for a particular user and APN combination are required to be assigned to the same P-GW DP worker instance. FIG. 2 illustrates this problem in more detail. In FIG. 2, P-GW 112 includes P-GW DP worker instances 200 and 202. Each P-GW DP worker instance 200 and 202 handles APN AMBR uplink and downlink rate policing for a user and APN instance for messages or PDN sessions directed to or from a particular PDN 204. P-GW 112 is assigned a service IP address 206 that AP1 105 uses to contact P-GW 112. In the illustrated example, two different PDN sessions having a non-GBR dedicated bearer and a default non-GBR bearer have been established between UE 100 and PDN 204. Each PDN session includes data in the uplink and downlink directions that must be policed for AMBR compliance.

In the illustrated example, all of the PDN sessions for UE 100 are handled by P-GW DP worker instance 200. One problem with this architecture is that when P-GW DP worker instance 200 is running at full rated capacity and handling PDN sessions from a single UE or multiple UEs, a new PDN session for any of the UEs currently being handled by P-GW DP worker instance 200 must be rejected because P-GW DP worker instance 200 does not have the capacity to handle another session. This is true even though P-GW DP worker instance 202 has capacity. Because there is no communication between P-GW DP worker instances for AMBR compliance, using the current architecture, all P-GW DP worker instances must be assigned all of the PDN sessions for a given UE.

Figure 3:
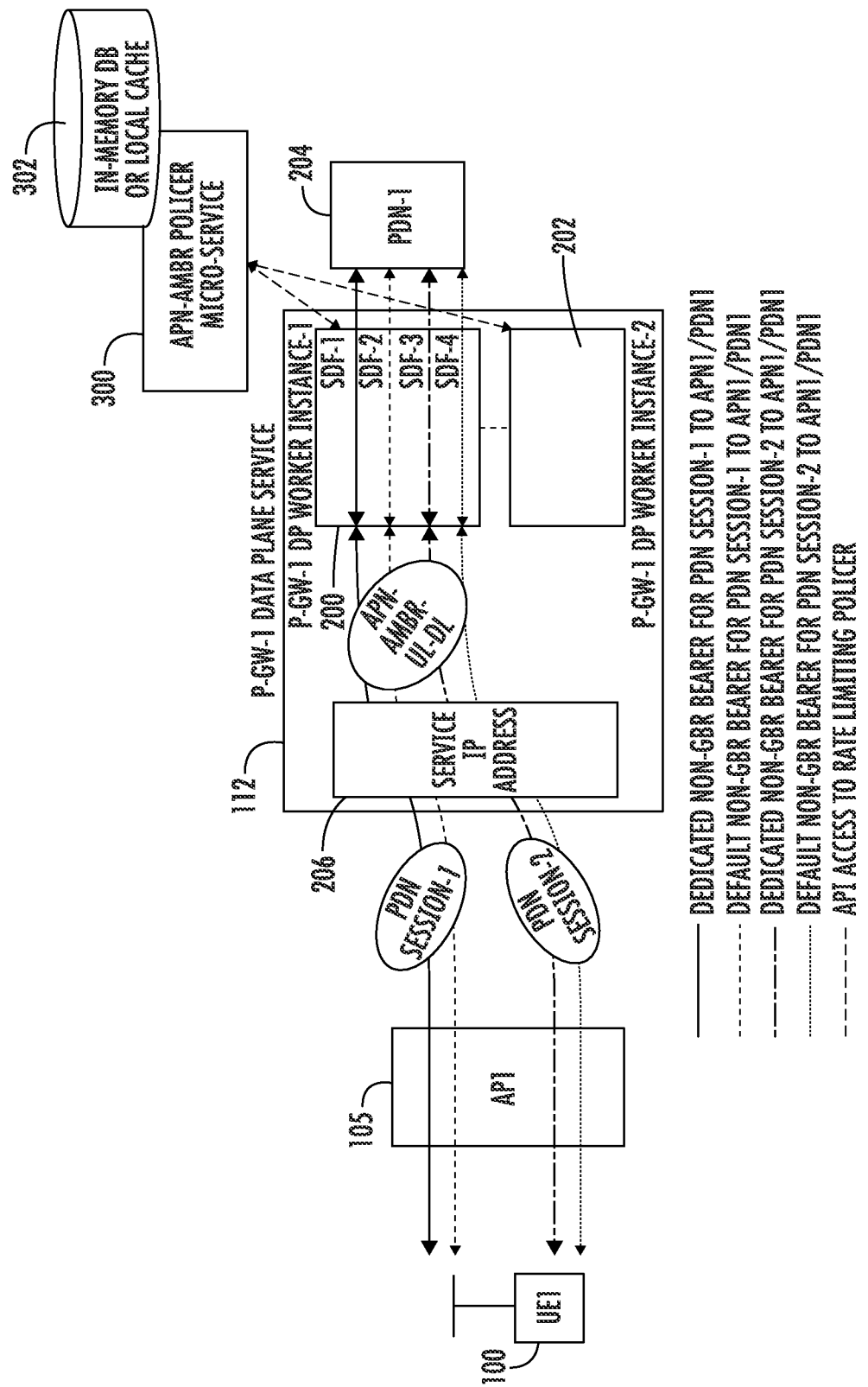
FIG. 3 is a network diagram illustrating the use of an APN-AMBR policer to allocate APN-AMBR capacity to PDN sessions.

The subject matter described herein provides a solution to this problem by allowing PDN sessions of a UE towards a single PDN to span different P-GW DP worker instances. In order to provide AMBR compliance, an APN-AMBR policer is provided. FIG. 3 illustrates an example of the APN-AMBR policer. In FIG. 3, APN-AMBR policer 300 may be implemented as a microservice located on a separate computing platform from P-GW 112 and P-GW DP worker instances 200 and 202. APN-AMBR policer 300 maintains uplink and downlink APN-AMBR per-UE, per-APN, even when the PDN sessions for a given UE reside on different P-GW DP worker instances. The per-UE, per-APN, and total AMBR used by each UE-APN combination is maintained in database 302. APN-AMBR policer 300 allocates APN-AMBR capacity slices to each P-GW DP worker instance for each UE/APN using a token bucket algorithm, which will be described in detail below. APN-AMBR policer maintains used up capacities for each UE and APN combination and stores the data in database 302, which may be an in-memory database or local cache for faster access.

As a result of the policing performed by APN-AMBR policer 300, the APN-AMBR policing logic at each P-GW DP worker instance is simplified in that each P-GW DP worker instance will request AMBR capacity slices from APN-AMBR policer 300 and receive grants from APN-AMBR policer 300. Each P-GW DP worker instance 200 and 202 will then use the capacity in each grant using a token consumption algorithm, which will be described in detail below. If a current slice of capacity is exhausted, the P-GW DP worker instance will request additional capacity from APN-AMBR policer 300. In the case where APN-AMBR policer 300 refuses a capacity request, the requesting P-GW DP worker instance will drop traffic. APN-AMBR policing is seamless when P-GW DP worker instances scale up or down.

Figure 4:
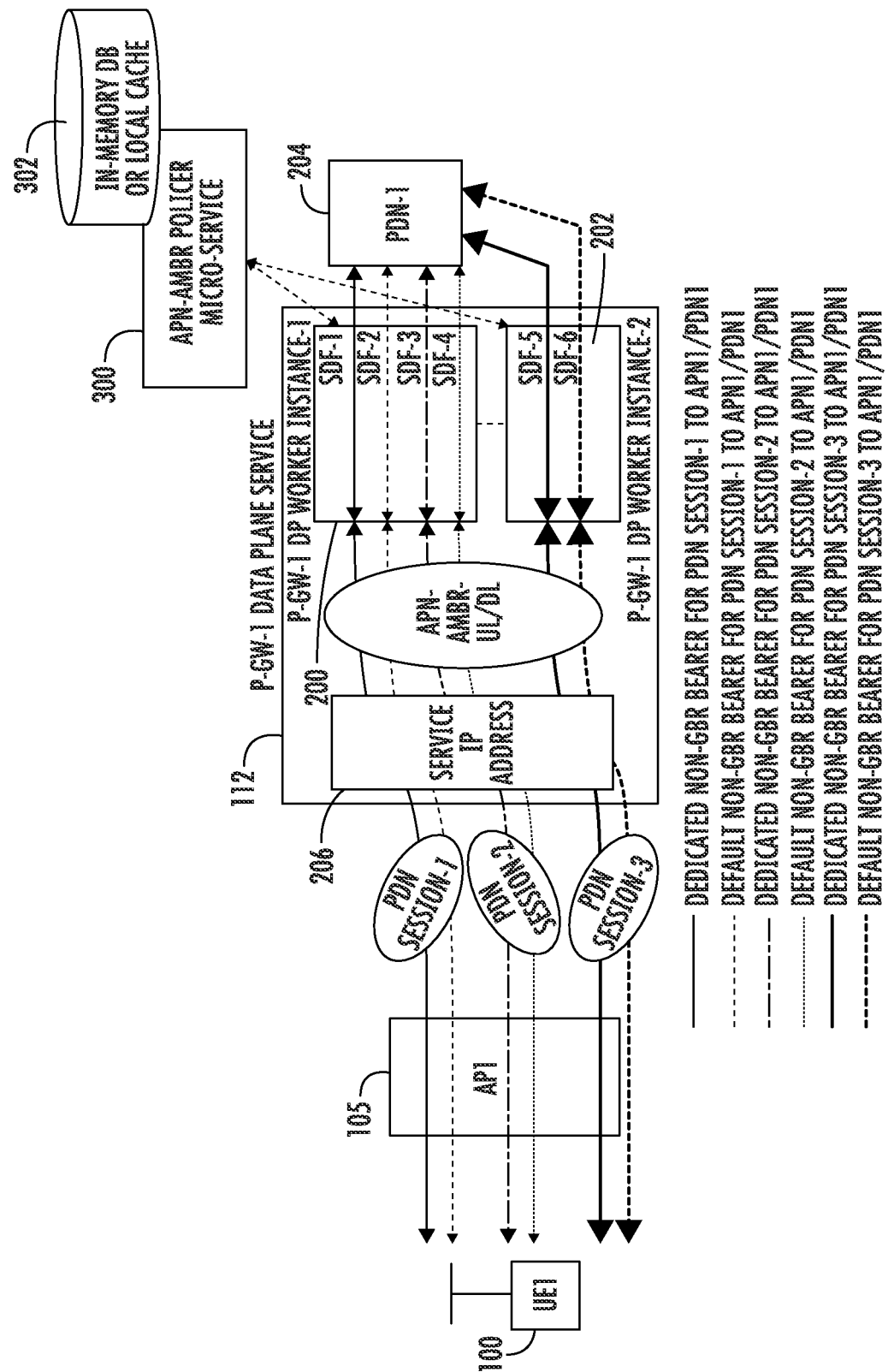
FIG. 4 is a network diagram illustrating the assignment of PDN sessions for the same UE and APN to different P-GW DP worker instances and the use of the APN-AMBR policer to enforce APN-AMBR for the PDN sessions.

FIG. 4 illustrates the case where a PDN session for a given UE and APN combination is assigned to a different P-GW DP worker instance than other PDN sessions involving the same UE and APN combination. In FIG. 4, PDN session 1 and PDN session 2 for APN1 and UE1 are assigned to P-GW DP worker instance 1 200. An additional PDN session, PDN3, is assigned to P-GW DP worker instance 202. The additional PDN session is for the same UE and APN combination as to those assigned to P-GW DP worker instance 1. APN-APN-AMBR policer 300 enforces APN-AMBR for the UE and APN combination for P-GW DP worker instance 1 200 and P-GW DP worker instance 2 202.

Figure 5:
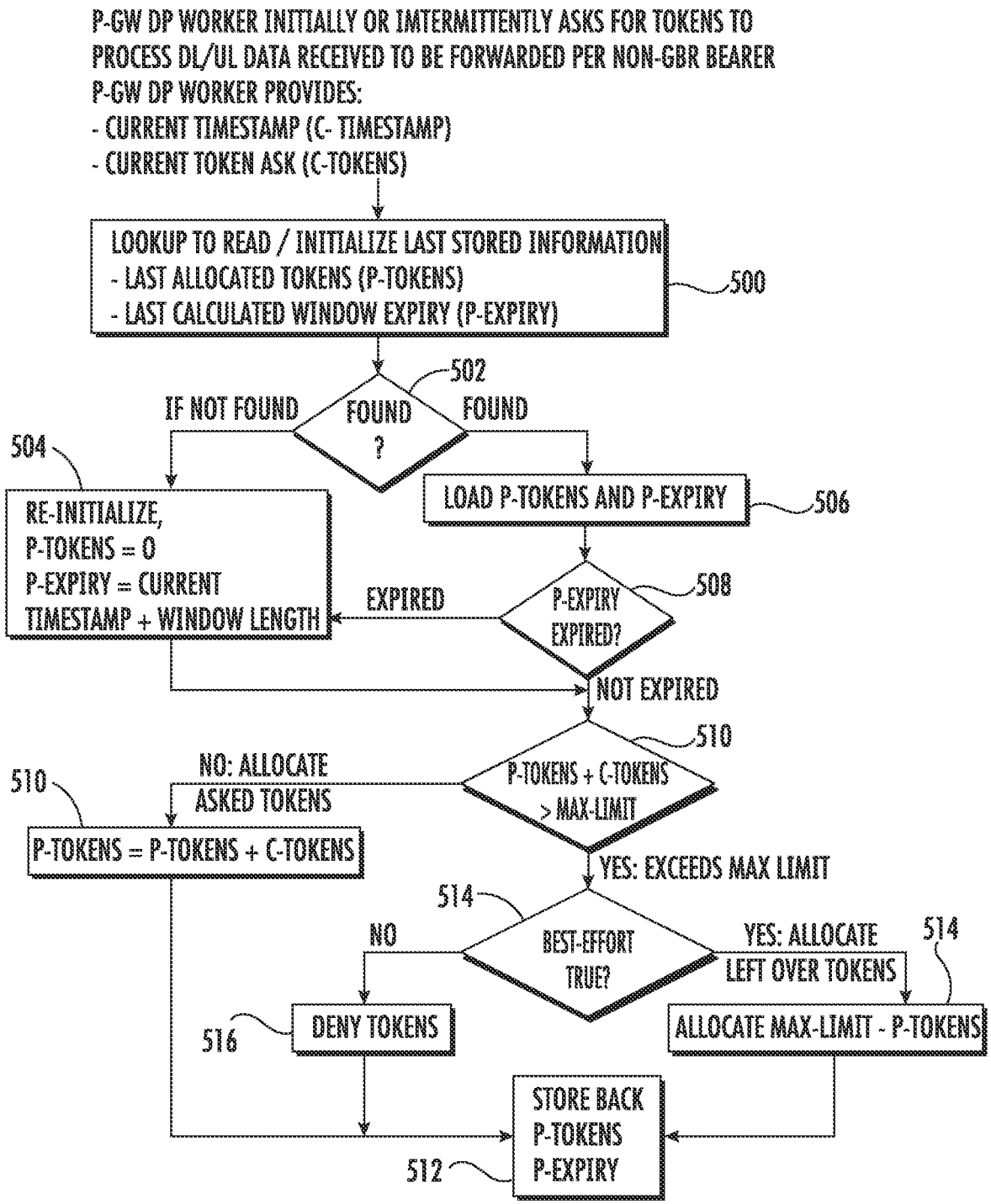
FIG. 5 is a flow chart illustrating an exemplary fixed window token bucket algorithm that may be implemented by the APN-AMBR policer in FIG. 3 to allocate APN-AMBR to PDN sessions.

As stated above, in one example, APN-AMBR policer 300 implements a token bucket algorithm for performing rate limiting policing on at least one of a per-UE, per-PDN session, and per-APN basis. The token bucket algorithm may be implemented for every PDN for every rate limiting window, where a rate limiting window is a time period, such as 1 second, over which a rate limiting capacity of the PDN can be defined using a number of tokens that can be granted during the window. A P-GW DP worker instance may demand multiple tokens in a rate limiting window from APN-AMBR policer 300 (1 token for each unit of data to be transmitted (e.g., 1 token=100 kbits)). The token demanding algorithm for P-GW DP worker instances will be described in detail below. APN-AMBR policing may be implemented in two different algorithms. One algorithm uses a fixed window and another algorithm uses a sliding window. FIG. 5 illustrates the fixed window rate policing algorithm that may be implemented by APN-AMBR policer 300. The fixed window algorithm works with two different configurations. One configuration is max limit configuration where, if the number of requested tokens would cause the APN-AMBR to be exceeded, the request is denied. Another configuration option is the best effort configuration option in which if the number of tokens requested in a given window exceeds the number of available tokens, the available tokens can be allocated even though they do not completely satisfy the current request. For every token demand, APN-AMBR policer 300 returns the granted tokens as per the algorithm and the time remaining in the current window.

Referring to the flow chart in FIG. 5, a P-GW DP worker instance may initially or intermittently request tokens to process received data to be forwarded per non-GBR bearer. The algorithms illustrated in FIGS. 5-7 run separately for uplink and downlink data for each non-GBR bearer. The request for allocation of tokens may include the current timestamp and the current token ask (number of tokens requested). In step 500, APN-AMBR policer 300 receives the request for allocation of tokens and performs a lookup in database 302 to determine whether the request is a new request for the current time interval or whether tokens have already been allocated to the requester during the current time interval. Here, the requester may be identified by a combination of APN and UE identifier. In step 502, if a record is not found in the lookup, the request is a new request, and control proceeds to step 504 where we begin the first window of token allocation for the UE-APN combination. Here, the number of previously allocated tokens is set to zero because the window is just been created, and the previous expiry time is set to the current timestamp plus the window length, i.e., the expiry time of the created window. In step 502, if a record is found, then the request is a subsequent request for the same requester, and control proceeds to step 506 where the previously allocated tokens and the previous expiry time are loaded.

In step 508, it is determined whether the P-Expiry timer has expired. The P-Expiry timer controls the expiration of previously allocated tokens. If the P-Expiry timer has expired, control proceeds to step 504 where the current request is processed like a new request. If the previous expiry timer has not expired in step 508, control proceeds to step 510. In step 510, it is determined whether the previous number of allocated tokens plus the current number of requested tokens exceeds the maximum limit for the UE and APN combination for the time interval. If the maximum limit is not exceeded, control proceeds to step 510 where the requested tokens are allocated, and the variable P-Tokens (previous tokens) is set to be equal to the current value of P-Tokens plus C-Tokens (currently requested tokens). In step 512, the values of P-Tokens and C-Tokens are stored in database 302. The P-GW DP worker instance can then consume the tokens by forwarding uplink or downlink data over the non-GBR bearer. In one implementation, one token allows the P-GW DP worker instance to send an operator-configured amount of uplink or downlink data (e.g., one token allows 100 kbits of data to be transferred). After the P-GW DP worker instance sends the defined amount of uplink data over the PDN or downlink data to the UE, the P-GW DP worker instance decrements the number of available tokens.

Returning to step 510, if the previously allocated tokens plus the currently requested tokens for the time interval exceeds the maximum limit, control proceeds to step 512 where it is determined whether best effort allocation is implemented. As described above, best effort allocation allows tokens to be allocated even when the number of available tokens is not sufficient to satisfy the current request. If best effort allocation is not implemented, control proceeds to step 516 where the token demand is denied and then to 512 where the values of P-Tokens and P-Expiry are stored in database 302. If best effort allocation is implemented, control proceeds to step 514 where the leftover tokens are allocated. The number of tokens allocated is equal to the maximum limit minus the previously allocated tokens. Control then proceeds to step 512 where the values of P-Tokens and P-Expiry are stored in database 302.

FIG. 5 illustrates the fixed window token allocation algorithm implemented by APN-AMBR policer 300. As stated above, in another example, the token allocation algorithm may utilize a sliding window. In a sliding window approach, the initial and expiry time for a given token allocation window move in time. Tokens within a window are divided into buckets, and each bucket has a start time and a length. When the current timestamp passes the end of a bucket (bucket start time plus length), unused tokens within the bucket expire and can be reclaimed and used to satisfy requests for tokens from the same or other P-GW DP worker instances. Using a sliding window thus increases the availability of unused tokens.

Figure 6:
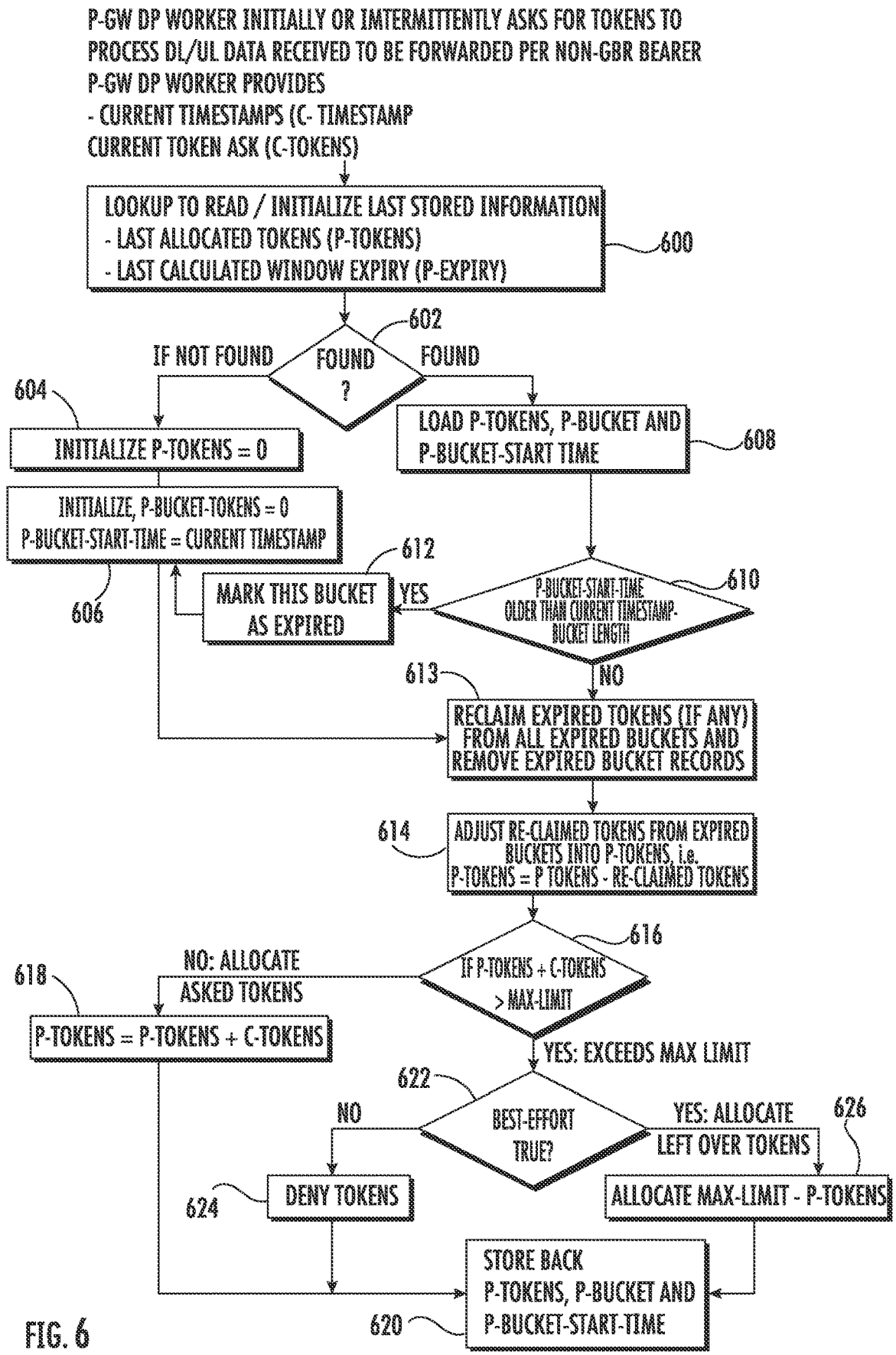
FIG. 6 is a flow chart illustrating a sliding window token bucket algorithm that may be implemented by the APN-AMBR policer to allocate APN-AMBR capacity to PDN sessions.

FIG. 6 is a flow chart illustrating an exemplary sliding window token bucket algorithm that may be implemented by APN-AMBR policer 300. Referring to FIG. 6, a P-GW DP worker instance initiates or intermittently asks for tokens to process uplink or downlink data that the P-GW DP worker instance receives for transmission. The request specifies the current timestamp and the current number of tokens requested. In step 600, APN-AMBR policer 300 performs a lookup in database 302 to determine whether the request is a new request for the time interval or an existing request. If a database record is not located in the lookup, the request is a new request. Accordingly, control proceeds from step 602 to step 604 where the previously allocated tokens variable (P-Tokens) for the time interval is initialized to zero. Control then proceeds to step 606 where the variable P-Bucket-Tokens is set to zero and the variable P-Bucket-Start-Timestamp is set to the current timestamp.

In step 602, if a database record is found, then the request is a subsequent request for the current time interval. If the request is a subsequent request, control proceeds to step 608 where the previously allocated tokens (P-Tokens), the variables P-Bucket, P-Tokens, and P-Bucket-Start-Time are initialized to the values located in the record. Control then proceeds to step 610 where it is determined whether the variable P-Bucket-Start-Time is older than the current timestamp minus the bucket length. If this is true, control proceeds to step 612 where the current bucket is marked as expired and then to step 606 where the variable P-Bucket-Tokens is set to zero, and the variable P-Bucket-Start-Time is set to the current timestamp.

After step 610, control proceeds to step 613 where any expired tokens are reclaimed from expired buckets, and expired bucket records are removed. From step 613, control proceeds to step 614 where reclaimed tokens from expired buckets are adjusted into P-Tokens (i.e., P-Tokens=P-Tokens−reclaimed tokens). Control then proceeds to step 616 where it is determined whether the sum of the previously allocated tokens and the current requested tokens is greater than the maximum limit. If the sum of the previously allocated tokens and the currently requested tokens is not greater than the maximum limit, the tokens are allocated and control proceeds to step 618 where P-Tokens is set to the previously allocated tokens plus the currently requested tokens. Control then proceeds to step 620 where the values of the variables P-Tokens, P-Bucket, and P-Bucket-Start-Time are stored in database 302.

Referring to step 616, if the sum of the previously allocated tokens and the currently requested tokens exceeds the maximum limit for the time interval, control proceeds to step 622 where it is determined whether best effort allocation is implemented. If best effort allocation is not implemented, control proceeds to step 624 where the request is denied. If best effort allocation is implemented, control proceeds to step 626 where the remaining tokens are allocated to partially satisfy the request. Control then proceeds to step 620 where the values of the P-Tokens, P-Bucket, P-Bucket-Start-Time variables are stored in database 302.

Figure 7A:
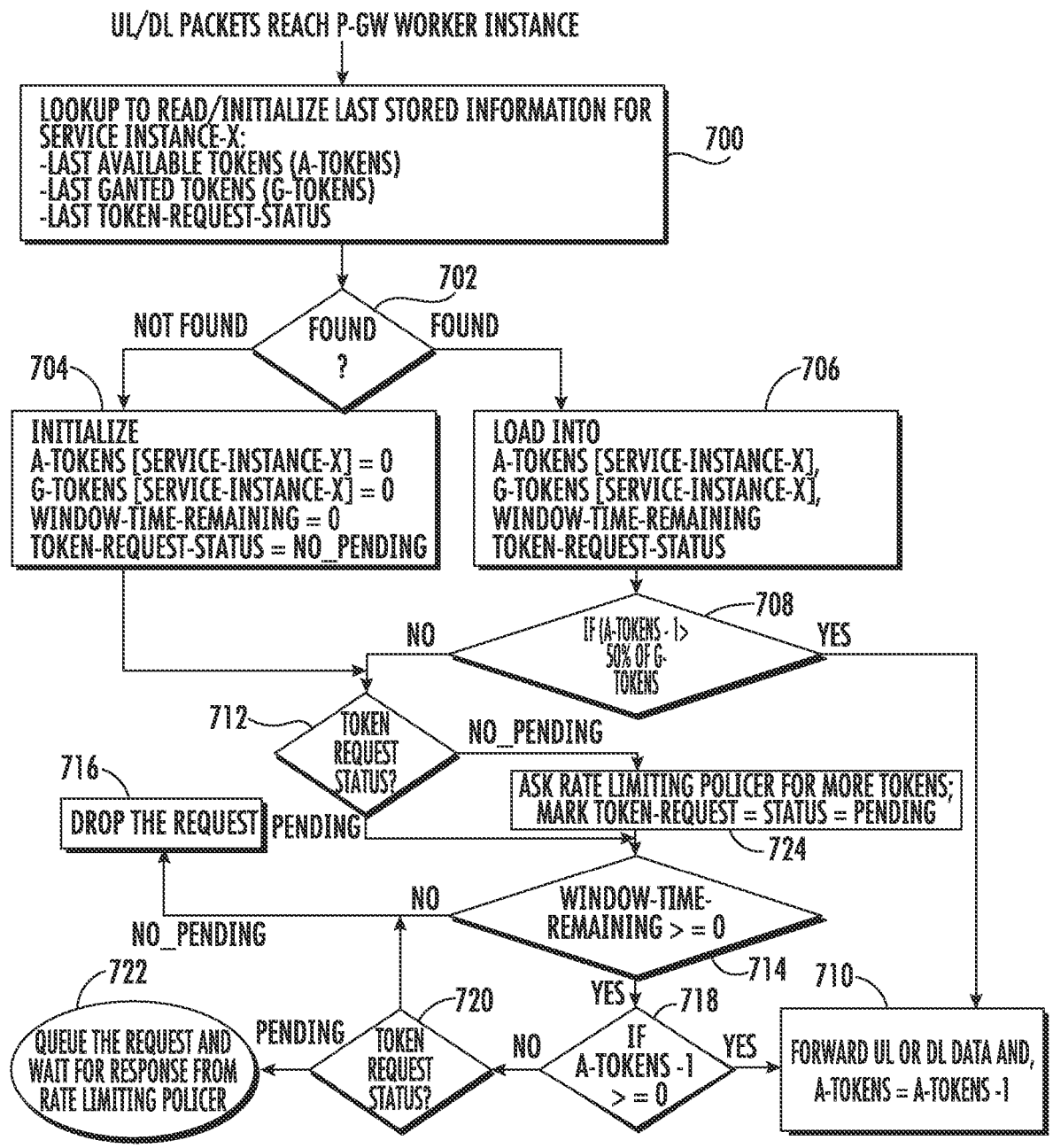
FIG. 7A is a flow chart illustrating a token demanding algorithm that may be implemented by a P-GW DP worker instance.
Figure 7B:
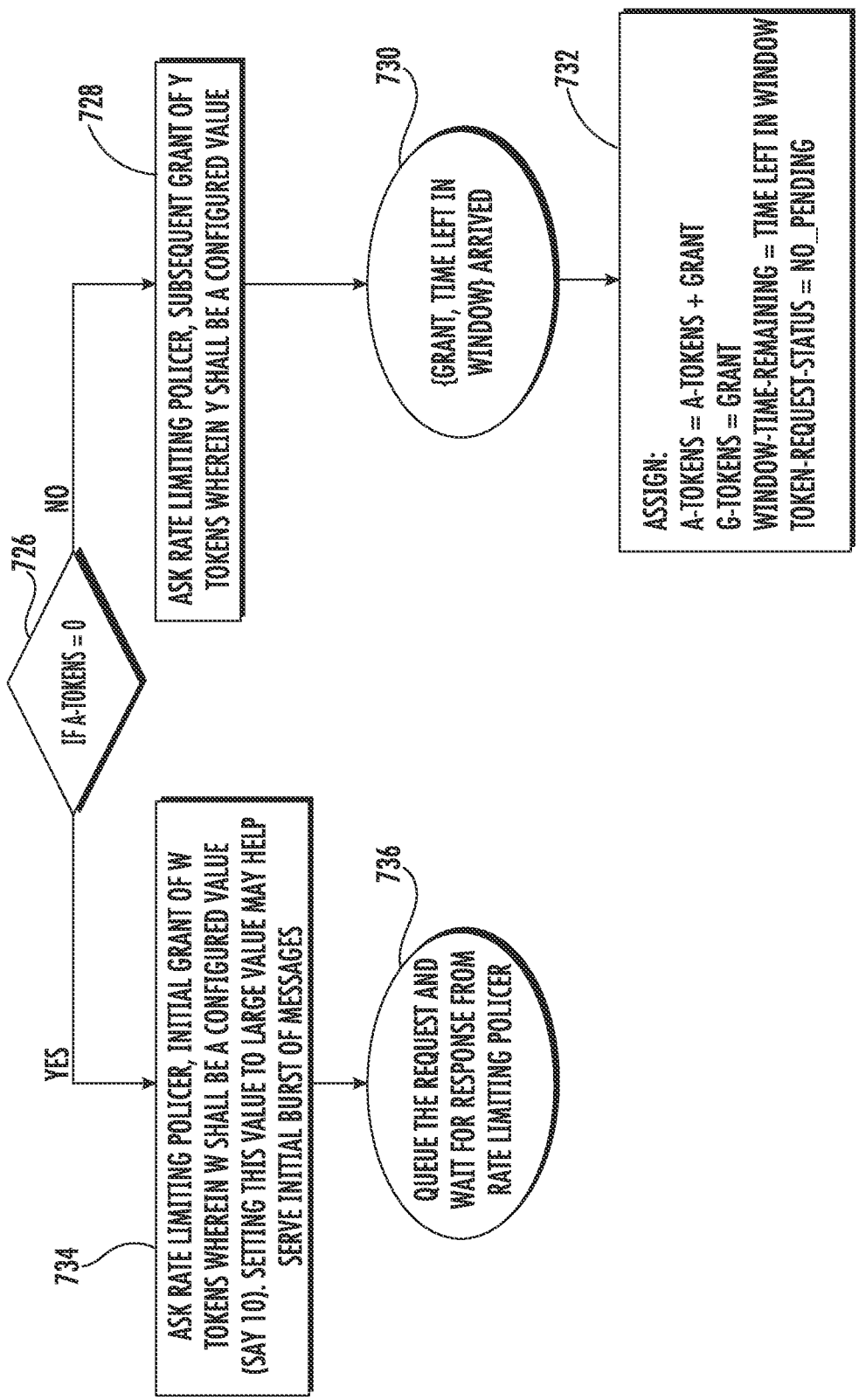
FIG. 7B is a flow chart illustrating a portion of the token demanding algorithm implemented by a P-GW DP worker instance.

As stated above, by implementing rate limiting policing at APN-AMBR policer 300 separate from the P-GW DP worker instances, the logic of the P-GW DP worker instances is simplified. FIGS. 7A and 7B illustrate the P-GW DP worker instances token demanding algorithm that may be implemented by each P-GW DP worker instance. In general, each P-GW DP worker instance receives uplink or downlink data, determines the number of tokens required to transmit the data and asks APN-AMBR policer 300 for an initial grant of tokens. For subsequently received data, the P-GW DP worker instance checks whether the number of available tokens is greater than a configurable percentage of the granted tokens and forwards the request. For example, in an aggressive token demanding algorithm, the threshold amount may be set to 50% or higher to anticipate last minute token scarcity. In a less aggressive algorithm, the threshold may be set to a lower percentage, such as 25%, to allow the P-GW DP worker instances to nearly deplete their token allocations before demanding more tokens. Subsequent token demands can be fixed in size or successively increasing in size, e.g., based on a Fibonacci series. P-GW DP worker instances do not need to manage the rate limiting time window traversal. The APN-AMBR policer will provide remaining time in the current window.

Referring to the flow chart illustrated in FIG. 7A, a P-GW DP worker instance receives uplink or downlink data to be transmitted. In step 700, the P-GW DP worker instance performs a lookup in its local database for service instance x, which may represent uplink or downlink data for a non-GBR bearer assigned to a UE-APN combination to determine the current number of tokens available, the current number of tokens granted, and the last token request status for the given service instance. It is noted that the P-GW DP worker instance is not required to know the rate capacity of the service instance or the amount of available capacity that is being used by other consumers. The database maintained by each P-GW DP worker instance may contain the number of tokens granted by the APN-AMBR policer to the P-GW DP worker instance for each service instance and the number of those tokens that have not been used.

In step 702, if a record is not found, this means that the P-GW DP worker instance has not requested any tokens for the service instance (i.e., non-GBR bearer) during the current time interval. Control then proceeds to step 704 where the P-GW DP worker instance initializes the available tokens for service instance x to 0, the granted tokens for service instance x to 0, the window time remaining to 0, and the token request status to none pending.

If a record is found, this means that the P-GW DP worker instance has already requested tokens during the current time interval for the service instance. If a record is found, control proceeds to step 706 where the P-GW DP worker instance loads the information located in the lookup. The information loaded includes the available tokens for the service instance, the granted tokens for the service instance, the window time remaining, and the token request status. In step 708, the P-GW DP worker instance determines whether the available tokens minus one is greater than the above-referenced configurable percentage of the granted tokens. In other words, the P-GW DP worker instance will ask for new tokens if more than half of the existing tokens previously allocated to the service instance have been used for the current time interval. This is an aggressive algorithm but may prevent the service instance from starving.

If the available tokens minus one is greater than the configurable percentage of the granted tokens, no new tokens are needed and control proceeds to step 710 where the uplink or downlink data is forwarded to the PDN or to the UE, and the available tokens variable is decremented to indicate the use of one token to satisfy the data transmission.

If the available tokens minus one is not greater than the configurable percentage of the granted tokens, control proceeds to step 712 where the P-GW DP worker instance determines whether there is a pending token request for the current time interval. If there is a pending token request, control proceeds to step 714 where it is determined whether there is any time remaining the current window. If there is no time remaining in the current window, the P-GW DP worker instance drops the token request in step 716. If there is time remaining in the current window, control proceeds to step 718 where the P-GW DP worker instance determines whether there are any available tokens. If there are available tokens, control proceeds to step 710 where the P-GW DP worker instance forwards the uplink or downlink data and decrements the number of available tokens. If there are no available tokens, control proceeds to step 720, where it is determined what the pending token request status is. If there is a token status request, control proceeds to step 722 where the request is queued, and the P-GW DP worker instance waits for the response from the APN-AMBR policer. If there are no pending token requests, control proceeds to step 716 where the current request is dropped.

In step 712, if there are no pending token requests and the number of available tokens is less than half of the granted tokens, control proceeds to step 724 where the P-GW DP worker instance requests tokens from the APN-AMBR policer and marks the pending token status request variable to pending.

FIG. 7B illustrates the token demanding algorithm. In FIG. 7B, in step 726, if the number of the available tokens is not equal to zero, control proceeds to step 728 where the P-GW DP worker instance asks the APN-AMBR policer for a grant of y tokens where y is configurable value. In step 730, the P-GW DP worker instance receives a grant with time left in the current window. In step 732, the P-GW DP worker instance sets the available tokens to the number of currently available tokens plus the grant. The granted tokens variable is set to the number of tokens in the grant. The window time remaining variable is set to the time remaining in the current window and the token request status is set to no pending requests.

In step 726, if the number of available tokens is equal to zero, control proceeds to step 734 where the P-GW DP worker instance asks the APN-AMBR policer for an initial grant w tokens, where w is a configurable value. Setting w to be a large value may facilitate serving an initial burst of messages. In step 736, the P-GW DP worker instance waits for grant from the rate the APN-AMBR policer. When the grant occurs in step 730, control proceeds to step 732 where the P-GW DP worker instance updates its variables to reflect the token grant.

Figure 8:
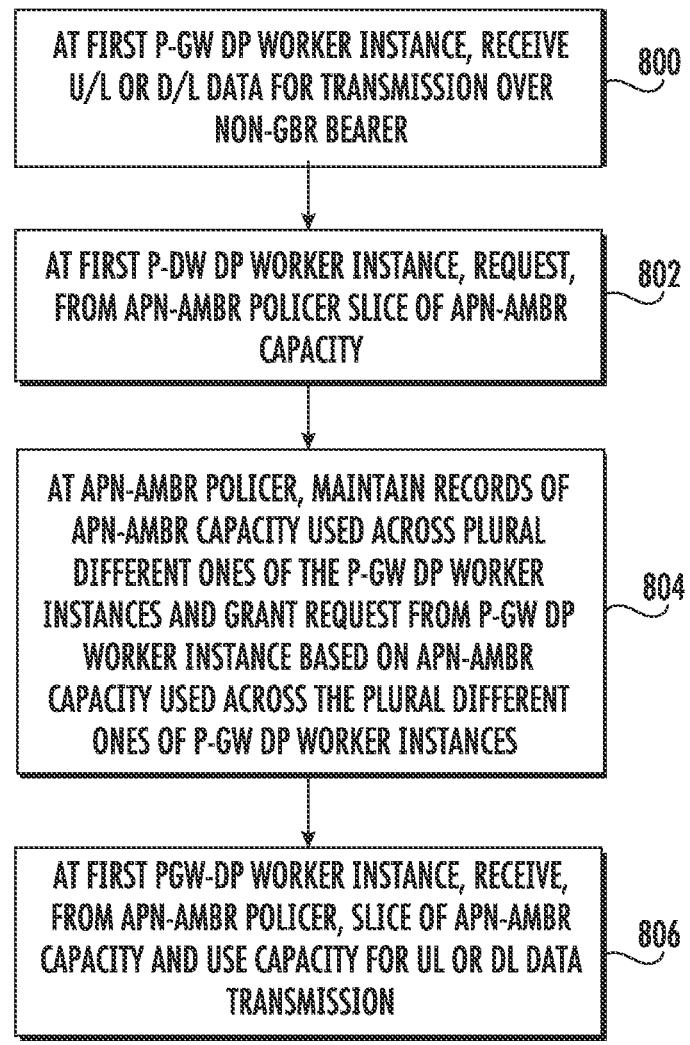
FIG. 8 is a flow chart illustrating an exemplary process for using an APN-AMBR policer to allocate APN AMBR capacity.

FIG. 8 is a flow chart illustrating an exemplary overall process for enforcing APN-AMBR using an APN-AMBR policer. Referring to FIG. 8, in step 800, a first P-GW DP worker instance receives uplink or downlink data for transmission over a non-GBR bearer. For example, P-GW DP worker instance 200 may receive uplink data from a UE for transmission to a PDN via a non-GBR bearer or downlink data from the PDN for transmission to the UE over the non-GBR bearer.

In step 802, the process includes, at the first P-GW DP worker instance, requesting capacity from the APN-AMBR policer. For example, P-GW DP worker instance 200 may request an allocation of tokens from APN-AMBR policer 300 corresponding to the amount of uplink or downlink data that the P-GW DP worker instance has received for transmission.

In step 804, the process includes, at the APN-AMBR policer, maintaining records of APN-AMBR capacity across plural different ones of the P-GW DP worker instances and granting the request from the first P-GW DP worker instance based on the APN-AMBR capacity used across the plural P-GW DP worker instances. For example, APN-AMBR policer 300 may determine that tokens are available to the UE-APN combination for the given time interval because the configured limit of the APN-AMBR available to the UE-APN combination has not been reached. In such a case, APN-AMBR policer 300 may issue a grant of tokens to P-GW DP worker instance 200. It should be noted that APN-AMBR policer 300 maintains records of used-up APN-AMBR capacity across plural P-GW DP worker instances for the case where the UE-APN combination has PDN sessions being handled by different P-GW DP worker instances. This is one of the advantages of the subject matter described herein in that rate limiting policing can be performed without requiring all PDN sessions for a given UE-APN combination to be assigned to the same P-GW DP worker instance. For the case where PDN sessions for the same UE-APN combination are assigned to different P-GW DP worker instances, APN-AMBR policer 300 will update the capacity used any time a grant of tokens is issued to any of the PDN sessions. In addition, because APN-AMBR policer 300 handles token allocations across all P-GW DP worker instances for a given P-GW, APN-AMBR policer 300 can also enforce the APN-AMBR limit across PDN sessions to different UEs, even when the PDN sessions of the different UEs are assigned to different P-GW DP worker instances.

The following examples illustrate functionality and advantages of the subject matter described herein. Suppose the APN-AMBR is 100 mbps for a particular APN. The APN-AMBR is an aggregate measure of the total capacity that can be used by non-GBR bearers of all UEs connected to a PDN through a given AP. In one example, the APN-AMBR policer described herein may maintain capacities per-UE-APN combination and allocate portions of the APN-AMBR to each UE-APN combination. For example, suppose the APN-AMBR is 100 mbps in each direction, and there are two UEs, each with two different sessions connected to a PDN through a given access point. Table 1 shown below is an example of the records that may be maintained in database 302 by APN-AMBR policer in such a case:

TABLE 1

Example APN-AMBR Policing Records

| UE-APN COMBINATION | PDN Session | Direction | APN Capacity Used | MAX APN-AMBR SLICE ALLOCATION |
|---|---|---|---|---|
| UE1-APN1 | PDN1 | Uplink | 10 mbps | 50 mbps |
|  |  | Downlink | 20 mbps | 50 mbps |
|  | PDN2 | Uplink | 5 mbps | 50 mbps |
|  |  | Downlink | 30 mbps | 50 mbps |
| UE2-APN1 | PDN3 | Uplink | 20 mbps | 50 mpbs |
|  |  | Downlink | 30 mbps | 50 mbps |

In Table 1, APN-AMBR policer 300 stores a single record for each UE-APN combination and may store, in each record, or compute from data in each record, the total amount of AMBR capacity used by each UE-APN combination, per-PDN session, and per-direction. APN-AMBR policer 300 may also store, in each record, a maximum APN-AMBR allocation for each UE-APN combination.

APN-AMBR policer 300 can use the data in Table 1 to police AMBR at the APN, UE, PDN session, and/or traffic direction level. For example, in Table 1, the combination UE1-APN1 is allocated 50 mbps of the APN-AMBR for each of the uplink and downlink directions. The current uplink AMBR capacity used is 10 mbps+5 mbps=15 mbps, which means that UE1 has 50 mbps-15 mbps=35 mbps of additional capacity to use. In this manner, the APN-AMBR policer can ensure that the total bandwidth used by both sessions does not exceed the portion or slice of the APN-AMBR allocated to each UE-APN combination. The same advantage is realized if PDN sessions for different UEs through the same APN are handled by different P-GW DP worker instances. For example, suppose UE1 and UE2 are both connected to PDN1 through AP1, handled by different P-GW DP worker instances, and the APN-AMBR is 100 mpbs. In this example, each of UE1 and UE2 may have access to their respective share (e.g. 50 mbps each) of the APN-AMBR and APN-AMBR policer 300 may police the bandwidth used by both sessions to ensure that the APN-AMBR is not exceeded.

Returning to FIG. 8, in step 806, the process includes, at the first P-GW DP worker instance, receiving, from the APN-AMBR policer, a slice of APN-AMBR capacity and using the capacity for uplink or downlink data transmission. For example, P-GW DP worker instance 200 may receive a grant of tokens from APN-AMBR policer 300 and consume the tokens to transmit the received uplink or downlink data.

Using the APN-AMBR policer, uplink and downlink traffic passing through the P-GW data plane can be more efficiently handled. The algorithms implemented by the P-GW DP worker instances are simplified as the worker instances are not required to perform policing or keep track of bandwidth used by PDN sessions assigned to another P-GW DP worker instance. In addition, PDN sessions for the same APN can be flexibly assigned across P-GW DP worker instances. Further, the uplink and downlink bandwidth offered to a PDN session for a particular APN is not limited to the rated capacity of a P-GW DP worker instance.

The disclosure of each of the following references is hereby incorporated herein by reference in its entirety.

REFERENCES 1. 3GPP TS 24.301; 3rd Generation Partnership Project; Technical Specification Group Core Network and Terminals; Non-Access Stratum (NAS) protocol for Evolved Packet System (EPS); Stage 3; (Release 17) V17.0.0 (2020-09).
2. 3GPP TS 23.682, 3rd Generation Partnership Project; Technical Specification Group Services and System Aspects; Architecture enhancements to facilitate communications with packet data networks and applications (Release 16), V16.8.0 (2020-09).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:
1. A method for policing access point name aggregated maximum bit rate (APN-AMBR), the method comprising:
   at a packet data network (PDN) gateway (P-GW) including at least one processor and a plurality of P-GW data plane (DP) worker instances implemented by the at least one processor:
      receiving, uplink data to be transmitted over a non-guaranteed bit rate (non-GBR) bearer associated with a first PDN session from a first user equipment

(UE) via an access point (AP) or downlink data to be transmitted over the non-GBR bearer to the first UE via the AP;
forwarding the uplink or downlink data to a first P-GW DP worker instance of the plurality of P-GW DP worker instances that is assigned to the PDN session;
at the first P-GW DP worker instance, transmitting, to an APN-AMBR policer separate from the P-GW, a request for a slice of APN-AMBR capacity for processing the uplink or downlink data;
at the APN-AMBR policer:
maintaining records of APN-AMBR capacity used by UEs having PDN sessions assigned to different ones of the P-GW DP worker instances; and
granting or denying the request based on the APN-AMBR capacity used by the PDN sessions assigned to the different ones of the P-GW DP worker instances.

2. The method of claim 1 wherein granting or denying the request includes granting the request and further comprising, at the APN-AMBR policer, communicating notification of the grant to the first P-GW DP worker instance and, at the first P-GW DP worker instance, receiving the notification of the grant and consuming the slice of APN-AMBR capacity represented by the grant by transmitting the uplink or downlink data.

3. The method of claim 1 wherein maintaining records of the APN-AMBR capacity used by the UEs includes maintaining records of the APN-AMBR capacity used by PDN sessions of the first UE that are assigned to the different ones of the P-GW DP worker instances.

4. The method of claim 1 wherein maintaining records of the APN-AMBR capacity used by the UEs includes maintaining records of the APN-AMBR capacity used by different PDN sessions of different UEs that are assigned to the different ones of the P-GW DP worker instances.

5. The method of claim 1 wherein transmitting the request for the slice of the APN-AMBR capacity includes requesting an allocation of tokens from the APN-AMBR policer for processing at least some of the uplink or downlink data.

6. The method of claim 5 wherein requesting an allocation of tokens includes requesting the allocation of tokens in response to a percentage of granted tokens available to the first P-GW DP worker instance being less than a threshold amount.

7. The method of claim 5 comprising, at the APN-AMBR policer, maintaining, for a plurality of UE-APN combinations, a maximum limit of tokens that can be allocated in a time interval and granting or denying the request for allocation of tokens based on whether a number of tokens requested by the request for allocation of tokens would cause the maximum limit of tokens to be exceeded, and the maximum limit of tokens is based on the APN-AMBR.

8. The method of claim 5 comprising implementing a fixed or a sliding window during which tokens can be granted.

9. The method of claim 5 wherein granting or denying the request includes implementing best effort token allocation wherein if a number of tokens requested by the first P-GW DP worker instance during a time interval would cause the maximum allocated tokens during the time interval to be exceeded, granting a remainder of tokens available in the time interval that would not cause the maximum limit of tokens to be exceeded.

10. The method of claim 5 wherein granting or denying the request includes implementing max limit token allocation by denying a request for allocation of tokens if a requested number of tokens would cause the maximum limit of tokens to be exceeded.

11. A system for policing access point name aggregated maximum bit rate (APN-AMBR), the system comprising:
a packet data network (PDN) gateway (P-GW) including at least one processor and a plurality of P-GW data plane (DP) worker instances implemented by the at least one processor, wherein the P-GW is configured to receive, uplink data to be transmitted over a non-guaranteed bit rate (non-GBR) bearer associated with a first PDN session from a first user equipment (UE) via an access point (AP) or downlink data to be transmitted over the non-GBR bearer to the first UE via the AP, forward the uplink or downlink data to a first P-GW DP worker instance of the plurality of P-GW DP worker instances that is assigned to the PDN session, and the first P-GW DP worker instance is configured to request a slice of APN-AMBR capacity for processing the uplink or downlink data; and
an APN-AMBR policer configured to maintain records of APN-AMBR capacity used by UEs having PDN sessions assigned to different ones of the P-GW DP worker instances, and grant or deny the request based on the APN-AMBR capacity used by the PDN sessions assigned to the different ones of the P-GW DP worker instances.

12. The system of claim 11, wherein the APN-AMBR policer is configured to grant the request, communicate notification of the grant to the first P-GW DP worker instance, and wherein the first P-GW DP worker instance is configured to receive the notification of the grant and consume the slice of APN-AMBR capacity represented by the grant by transmitting the uplink or downlink data.

13. The system of claim 11 wherein the APN-AMBR policer is configured to maintain records of the APN-AMBR capacity used by PDN sessions of the first UE that are assigned to the different ones of the P-GW DP worker instances.

14. The system of claim 11 wherein the APN-AMBR policer is configured to maintain records of the APN-AMBR capacity used by different PDN sessions of different UEs that are assigned to the different ones of the P-GW DP worker instances.

15. The system of claim 11 wherein the first P-GW DP worker instance is configured to request the slice of APN-AMBR capacity by requesting an allocation of tokens from the APN-AMBR policer for processing at least some of the uplink or downlink data.

16. The system of claim 15 the first P-GW DP worker instance is configured to request the allocation of tokens in response to a percentage of granted tokens available to the first P-GW DP worker instance being less than a threshold amount.

17. The system of claim 15 wherein the APN-AMBR policer is configured to maintain a maximum limit of tokens that can be allocated in a time interval and to grant or deny the request for allocation of tokens based on whether a number of tokens requested by the request for allocation of tokens would cause the maximum limit of tokens to be exceeded, and the maximum limit of tokens is based on the APN-AMBR.

18. The system of claim 15 wherein the APN-AMBR policer is configured to implement best effort token allocation wherein if a number of tokens requested by the first P-GW DP worker instance during a time interval would cause the maximum allocated tokens during the time interval to be exceeded, grant a remainder of tokens available in the time interval that would not cause the maximum limit of tokens to be exceeded, and the maximum limit of tokens is based on the APN-AMBR.

19. The system of claim 15 wherein the APN-AMBR policer is configured to implement max limit token allocation by denying a request for allocation of tokens if a requested number of tokens would cause the maximum limit of tokens to be exceeded and the maximum limit is based on the APN-AMBR.

20. A non-transitory computer readable medium having stored thereon executable instructions that when executed by at least one processor of at least one computer control the at least one computer to perform steps comprising:

at a packet data network (PDN) gateway (P-GW) including a plurality of P-GW data plane (DP) worker instances:

receiving, uplink data to be transmitted over a non-guaranteed bit rate (non-GBR) bearer associated with a first PDN session from a first user equipment (UE) via an access point (AP) or downlink data to be transmitted over the non-GBR bearer to the first UE via the AP;

forwarding the uplink or downlink data to a first P-GW DP worker instance of the plurality of P-GW DP worker instances that is assigned to the PDN session;

at the first P-GW DP worker instance, transmitting, to an APN-AMBR policer separate from the P-GW, a request for a slice of APN-AMBR capacity for processing the uplink or downlink data;

at the APN-AMBR policer:

maintaining records of APN-AMBR capacity used by UEs having PDN sessions assigned to different ones of the P-GW DP worker instances; and granting or denying the request based on the APN-AMBR capacity used by the PDN sessions assigned to the different ones of the P-GW DP worker instances.

\* \* \* \* \*

UNITED STATES PATENT AND TRADEMARK OFFICE
CERTIFICATE OF CORRECTION

PATENT NO. : 11,252,093 B2
APPLICATION NO. : 17/102404
DATED : February 15, 2022
INVENTOR(S) : Goel Page 1 of 2

It is certified that error appears in the above-identified patent and that said Letters Patent is hereby corrected as shown below:

On the Title Page

In the illustrative figure, under Reference Numeral 802, Line 1, delete "P-DW" and insert -- P-GW --.

In the illustrative figure, under Reference Numeral 806, Line 1, delete "PGW-DP" and insert -- P-GW DP --.

On page 4, Column 2, under Other Publications, Line 32, delete "IEFT" and insert -- IETF --, therefor.

On page 4, Column 2, under Other Publications, Line 47, delete "(IEFT) Netwok" and insert -- (IETF) Network --, therefor.

In the Drawings

On sheet 5 of 9, in FIG. 5, Line 1, delete "IMTERMITTENTLY" and insert -- INTERMITTENTLY --, therefor.

On sheet 6 of 9, in FIG. 6, Line 1, delete "IMTERMITTENTLY" and insert -- INTERMITTENTLY --, therefor.

On sheet 9 of 9, in FIG. 8, under Reference Numeral 802, Line 1, delete "P-DW" and insert -- P-GW --.

On sheet 9 of 9, in FIG. 8, under Reference Numeral 806, Line 1, delete "PGW-DP" and insert -- P-GW DP --.

In the Specification

Signed and Sealed this
Fifth Day of July, 2022

Katherine Kelly Vidal
*Director of the United States Patent and Trademark Office*

In Column 13, Line 53, delete "mpbs" and insert -- mbps --, therefor.

In Column 14, Line 12, delete "mpbs" and insert -- mbps --, therefor.